US012636625B2

(12) United States Patent
Ronning

(10) Patent No.: US 12,636,625 B2
(45) Date of Patent: May 26, 2026

(54) STATIC MIXER

(71) Applicant: RE MIXERS, INC, Madison, WI (US)

(72) Inventor: Eric Adam Ronning, Madison, WI (US)

(73) Assignee: RE MIXERS, INC, Madison, WI (US)

( * ) Notice: Subject to any disclaimer, the term of this patent is extended or adjusted under 35 U.S.C. 154(b) by 1070 days.

(21) Appl. No.: 17/771,078

(22) PCT Filed: Oct. 23, 2020

(86) PCT No.: PCT/US2020/057156

§ 371 (c)(1),
(2) Date: Apr. 22, 2022

(87) PCT Pub. No.: WO2021/081396

PCT Pub. Date: Apr. 29, 2021

(65) Prior Publication Data

US 2022/0379273 A1 Dec. 1, 2022

Related U.S. Application Data

(60) Provisional application No. 62/925,972, filed on Oct. 25, 2019.

(51) Int. Cl.

*B01F 25/4314* (2022.01)
*B01F 25/431* (2022.01)
*B01F 25/432* (2022.01)

(52) U.S. Cl.

CPC .... *B01F 25/43141* (2022.01); *B01F 25/4312* (2022.01); *B01F 25/432* (2022.01)

(58) Field of Classification Search

CPC ......................... B01F 25/432; B01F 25/43141
See application file for complete search history.

(56) References Cited

U.S. PATENT DOCUMENTS

| | | | | |
|---|---|---|---|---|
| 1,496,896 | A | 6/1924 | Laffoon | |
| 2,085,132 | A | 6/1937 | Underwood | |
| 3,195,865 | A | 7/1965 | Harder | |
| 3,239,197 | A * | 3/1966 | Tollar | B01F 25/432 366/337 |
| 3,404,869 | A | 10/1968 | Harder | |

(Continued)

FOREIGN PATENT DOCUMENTS

| | | |
|---|---|---|
| CN | 1720094 | 1/2006 |
| DE | 2128874 | 1/1973 |

(Continued)

OTHER PUBLICATIONS

EP Search Report, EP Patent Application No. 20879267.1, mailed Oct. 19, 2023, 7 pages.

(Continued)

*Primary Examiner* — Elizabeth Insler
(74) *Attorney, Agent, or Firm* — CASIMIR JONES, S.C.; Brian F. Bradley

(57) ABSTRACT

A mixer including a first inlet channel, a second inlet channel, and a first dividing wall positioned between the first inlet channel and the second inlet channel. The first dividing wall radially extending from a centerline. The first inlet channel directs material away from the centerline and the second inlet channel directs material toward the centerline.

18 Claims, 35 Drawing Sheets

(56) References Cited

U.S. PATENT DOCUMENTS

| | | | | |
|---|---|---|---|---|
| 3,406,947 | A | 10/1968 | Harder | |
| 3,643,927 | A | 2/1972 | Crouch | |
| 3,647,187 | A | 3/1972 | Dannewitz et al. | |
| 3,860,217 | A | 1/1975 | Grout | |
| 3,893,654 | A | 7/1975 | Miura et al. | |
| 4,032,114 | A | 6/1977 | Kolm | |
| 4,053,141 | A | 10/1977 | Gussefeld | |
| 4,072,296 | A | 2/1978 | Doom | |
| 4,093,188 | A | 6/1978 | Horner | |
| 4,112,520 | A | 9/1978 | Gilmore | |
| 4,145,520 | A | 3/1979 | Feltgen et al. | |
| 4,363,552 | A | 12/1982 | Considine | |
| 4,747,697 | A | 5/1988 | Kojima | |
| 4,801,008 | A | 1/1989 | Rich | |
| 4,848,920 | A * | 7/1989 | Heathe | B01F 25/432 366/339 |
| 5,425,581 | A | 6/1995 | Palm | |
| 5,489,153 | A | 2/1996 | Berner et al. | |
| 5,620,252 | A | 4/1997 | Maurer | |
| 5,688,047 | A | 11/1997 | Signer | |
| 5,851,067 | A | 12/1998 | Fleischli et al. | |
| 5,971,603 | A | 10/1999 | Davis et al. | |
| RE36,969 | E | 11/2000 | Streiff et al. | |
| 6,412,975 | B1 | 7/2002 | Schuchardt et al. | |
| 6,431,528 | B1 | 8/2002 | Kojima | |
| 6,467,949 | B1 | 10/2002 | Reeder et al. | |
| D466,595 | S | 12/2002 | Glanville | |
| 6,550,960 | B2 | 4/2003 | Catalfamo et al. | |
| 6,553,755 | B2 | 4/2003 | Homann et al. | |
| 6,575,617 | B2 | 6/2003 | Fleischli et al. | |
| 6,579,001 | B2 * | 6/2003 | Krumbock | B29C 48/362 366/339 |
| 6,595,679 | B2 | 7/2003 | Schuchardt | |
| 6,599,008 | B2 | 7/2003 | Heusser et al. | |
| 6,623,155 | B1 | 9/2003 | Baron | |
| 6,637,928 | B2 | 10/2003 | Schuchardt | |
| 6,676,286 | B2 | 1/2004 | Grutter et al. | |
| 6,769,801 | B1 | 8/2004 | Maurer | |
| 6,773,156 | B2 | 8/2004 | Henning | |
| 6,830,370 | B1 | 12/2004 | Uematsu | |
| 6,899,453 | B2 | 5/2005 | Koch et al. | |
| 7,198,400 | B2 | 4/2007 | Unterlander et al. | |
| 7,316,503 | B2 | 1/2008 | Mathys et al. | |
| 7,322,740 | B2 | 1/2008 | Heusser et al. | |
| 7,390,121 | B2 | 6/2008 | Jahn et al. | |
| 7,438,464 | B2 | 10/2008 | Moser et al. | |
| 7,793,494 | B2 | 9/2010 | Wirth et al. | |
| D625,771 | S | 10/2010 | Kojima | |
| 7,841,765 | B2 | 11/2010 | Keller | |
| 7,985,020 | B2 | 7/2011 | Pappalardo | |
| 8,061,890 | B2 | 11/2011 | Suhner | |
| 8,083,397 | B2 | 12/2011 | Pappalardo | |
| 8,684,593 | B2 | 4/2014 | Moser et al. | |
| 8,696,193 | B2 | 4/2014 | Herbstritt | |
| 8,753,006 | B2 | 6/2014 | Habibi-Naimi | |
| 8,936,391 | B2 | 1/2015 | Stoeckli et al. | |
| 9,003,771 | B2 | 4/2015 | Peters et al. | |
| 9,452,371 | B2 | 9/2016 | Gabler et al. | |
| 2008/0038425 | A1 | 2/2008 | Wilken | |
| 2008/0232190 | A1 | 9/2008 | Schneider | |
| 2008/0232191 | A1 | 9/2008 | Keller | |
| 2009/0122638 | A1 | 5/2009 | Sato et al. | |
| 2009/0255242 | A1 | 10/2009 | Paterson et al. | |
| 2010/0260009 | A1 | 10/2010 | Kingsford | |
| 2011/0182134 | A1 | 7/2011 | Pollard et al. | |
| 2013/0003494 | A1 | 1/2013 | Kirk | |
| 2016/0236161 | A1 | 8/2016 | Pappalardo | |
| 2017/0320028 | A1 * | 11/2017 | Ronning | B01F 35/522 |

FOREIGN PATENT DOCUMENTS

| | | |
|---|---|---|
| DE | 2711939 | 10/1977 |
| DE | 10 2013 210804 | 12/2014 |
| EP | 0063729 | 3/1982 |
| EP | 1153651 | 10/2005 |
| EP | 1125626 | 11/2005 |
| EP | 1437173 | 1/2006 |
| EP | 1754530 | 2/2007 |
| EP | 2058048 | 5/2009 |
| EP | 1712751 | 7/2012 |
| FR | 2346040 | 10/1977 |
| GB | 741030 | 11/1955 |
| GB | 891212 | 3/1962 |
| GB | 1515498 | 6/1978 |
| JP | 53-139672 | 4/1952 |
| JP | 62-269733 | 11/1987 |
| JP | 2000-354749 | 12/2000 |
| JP | 2004-188415 | 7/2004 |
| JP | 2009-113012 | 5/2009 |
| KR | 101379418 | 3/2014 |
| WO | WO8900076 | 1/1989 |
| WO | WO1999/000180 | 1/1999 |
| WO | WO2000/21650 | 4/2000 |
| WO | WO2007110316 | 10/2007 |
| WO | WO2011/119820 | 9/2011 |
| WO | WO2012116873 | 9/2012 |

OTHER PUBLICATIONS

Extended European Search Report issued Jun. 14, 2019 for corresponding European Application No. 16865144.6 (7 pages).

Ronning, "140501 ME351 Presentation Packet 1," May 8, 2014, 7 pages.

Ronning, "The PEC Mixer, A physical realization of Erwin's Law," Jan. 24, 2013, 28 pages.

Ronning et al., "Erwin Mixer," Oct. 8, 2013, 61 pages.

Indian Office Action dated Nov. 26, 2020 for corresponding Indian Application No. 201817017884 (9 pages).

Japan Office Action issued Sep. 25, 2020 for corresponding Japanese Application No. 2018-544774 (12 pages).

Chinese Office Action dated Sep. 17, 2020 for corresponding Chinese Application No. 201680073041.0 (16 pages).

International Search Report & Written Opinion, International Patent No. PCT/US2020/057156, mailed Jan. 27, 2021, 21 pages.

* cited by examiner

STATIC MIXER

CROSS-REFERENCE TO RELATED APPLICATIONS

This application is a 371 U.S. National Phase Entry of International Application No. PCT/US2020/057156, filed Oct. 23, 2020, which claims priority to U.S. Provisional Patent Application No. 62/925,972 filed on Oct. 25, 2019, the entire contents of which are incorporated herein by reference.

FIELD OF THE INVENTION

The present disclosure relates to a static mixer.

BACKGROUND OF THE INVENTION

A number of conventional motionless (i.e., static) mixer types exist that implement a similar general principle to mix fluids together. Specifically, fluids are mixed together by dividing and recombining the fluids in an overlapping manner. This action is achieved by forcing the fluid over a series of baffles of alternating geometry. Such division and recombination cause the layers of the fluids being mixed to diffuse past one another, eventually resulting in a generally homogenous mixture of the fluids. However, conventional mixers often result in a streaking phenomenon with streaks of fluid that pass through the mixer essentially unmixed.

Furthermore, to achieve adequate mixing (i.e., a generally homogenous mixture) additional baffles must be placed in the conventional mixer to thoroughly diffuse the material, thus increasing the mixer's overall length. Such an increase in mixer length is unacceptable in many motionless mixer applications, such as handheld mixer-dispensers. In addition, longer mixers generally have a higher retained volume and higher amounts of waste material as a result. A large amount of waste material is particularly undesirable when dealing with expensive materials. In other words, the length of the conventional static mixer is large, resulting in a large amount of wasted material that must pass through the static mixer before any mixed output is usable.

SUMMARY OF THE INVENTION

The disclosure provides, in one aspect, a mixer including a first inlet channel, a second inlet channel, and a first dividing wall positioned between the first inlet channel and the second inlet channel. The first dividing wall radially extending from a centerline. The first inlet channel directs material away from the centerline and the second inlet channel directs material toward the centerline.

The disclosure provides, in another aspect, a mixer including a first inlet channel, a second inlet channel, and a first dividing wall positioned between the first inlet channel and the second inlet channel. The first dividing wall radially extends from a centerline. The mixer further includes a third inlet channel positioned radially opposite from the first inlet channel about the centerline, a fourth inlet channel positioned radially opposite from the second inlet channel about the centerline, and a second dividing wall positioned between the third inlet channel and the fourth inlet channel. The second dividing wall radially extends from the centerline.

The disclosure provides, in another aspect, a mixer including a first inlet channel, a second inlet channel, and a dividing wall positioned between the first inlet channel and the second inlet channel. The dividing wall radially extends from a centerline. The mixer further includes a fin extending from the dividing wall.

Other aspects of the disclosure will become apparent by consideration of the detailed description and accompanying drawings.

Before any embodiments of the disclosure are explained in detail, it is to be understood that the invention is not limited in its application to the details of construction and the arrangement of components set forth in the following description or illustrated in the following drawings. The invention is capable of other embodiments and of being practiced or of being carried out in various ways.

DETAILED DESCRIPTION

Figure 1:
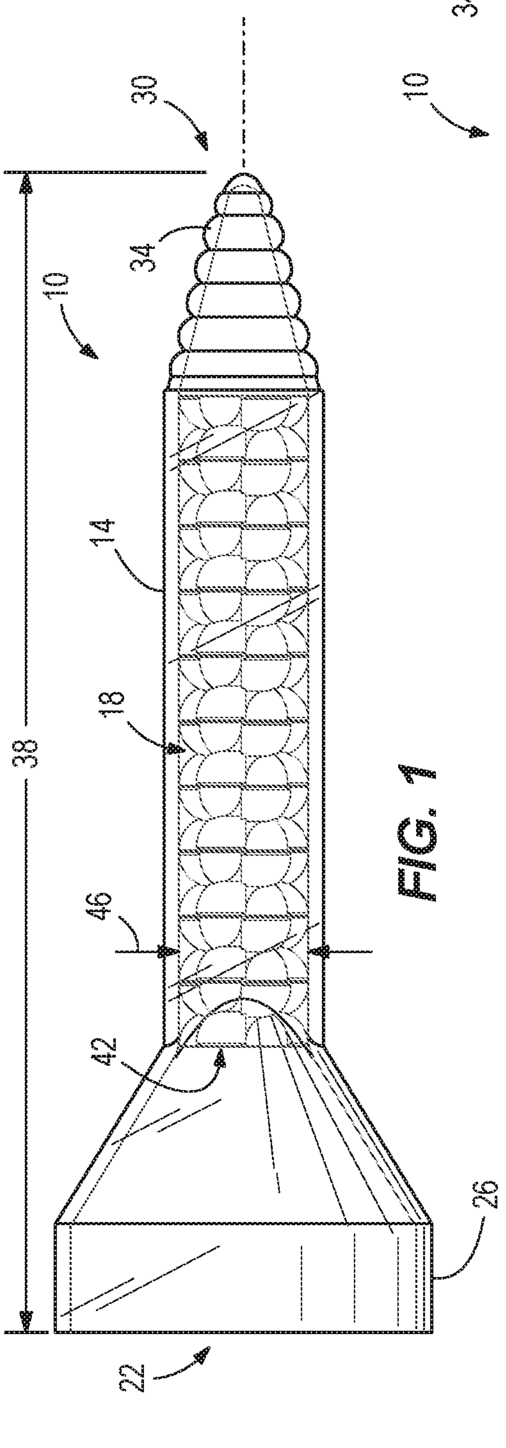
FIG. 1 is a side view of a static mixer according to an aspect of the disclosure.
Figure 2:
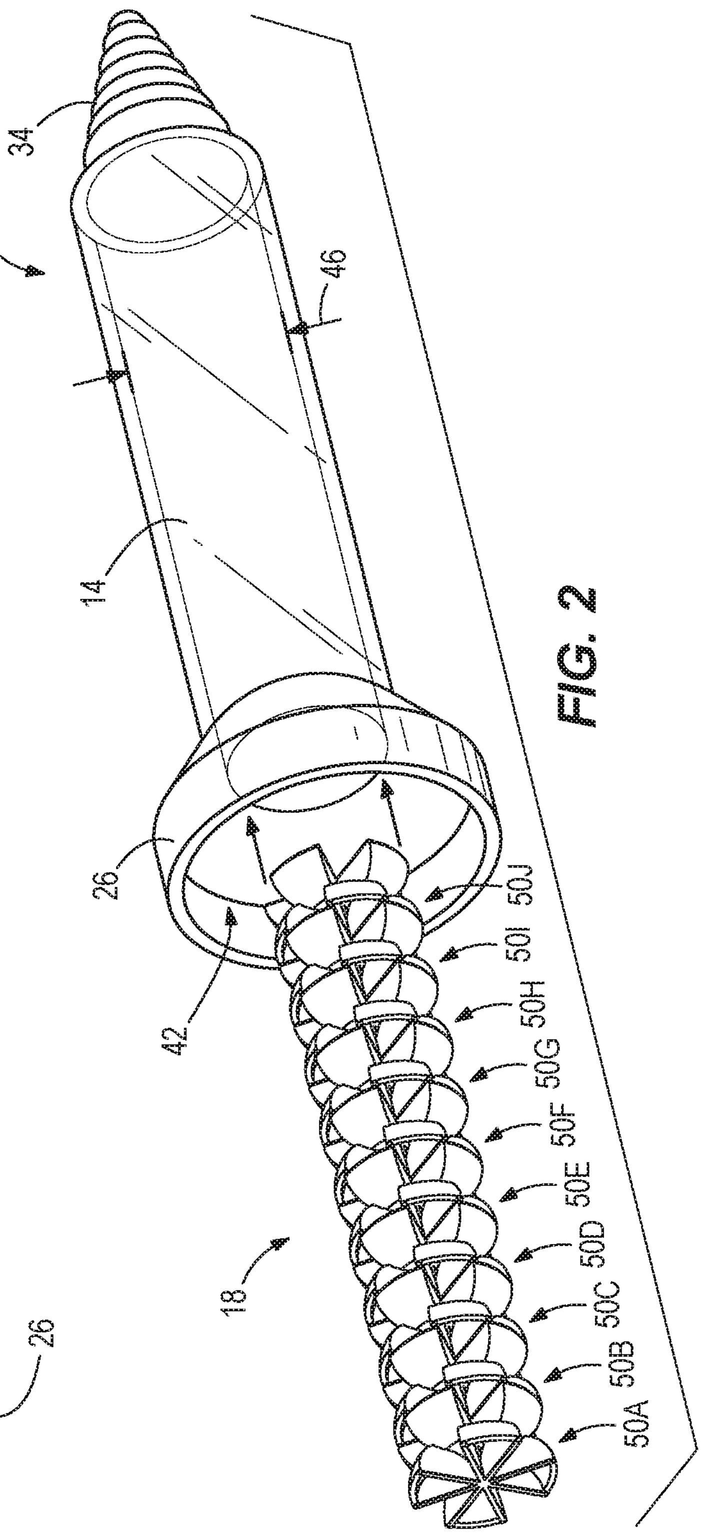
FIG. 2 is an exploded view of the static mixer of FIG. 2 illustrating a mixer assembly.

With reference to FIGS. 1 and 2, a static mixer 10 according to one embodiment of the invention is illustrated. The static mixer 10 includes a housing 14 and a mixer assembly 18 received within the housing 14. Specifically, the housing 14 includes an inlet end 22 formed with an inlet socket 26 and an outlet end 30 formed with a nozzle 34. The inlet end 22 and the outlet end 30 define a material flow path that extends therebetween. In other words, the inlet end 22 is upstream in the material flow path from the downstream outlet end 30. In the illustrated embodiment, the inlet socket 26 is formed as a bell-type inlet, but in alternative embodiments the inlet socket 26 may be formed as a bayonet-type inlet, for example. Other inlet configurations known to those of ordinary skill in the art may also be used. For example, the housing 14 may include industrial flanged piping. The static mixer 10 includes an overall length 38, which is smaller than the overall length of conventional static mixers. As explained in greater detail below, the static mixer 10 is able to create a more homogenous mixture (i.e., improved results) with a shorter overall length (i.e., less wasted material) compared to conventional mixers.

With reference to FIG. 2, the mixer assembly 18 is received within a chamber 42 (i.e., channel) defined by the housing 14. In the illustrated embodiment, the chamber 42 is circular and defines a diameter 46. In some embodiments, the mixer assembly 18 is received within a pipe, for example and industrial material carrying pipe, in which case the pipe corresponds to the housing 14. For example, the mixer assembly 18 can be utilized for a plug flow reactor (PFR). The mixer assembly 18 is configured to be received within a circular pipe and is therefore more readily integrated within existing pipelines. In some embodiments, the mixer assembly 18 is drafted or tapered from an upstream end toward a downstream end to more easily be assembled within the chamber 42.

The mixer assembly 18 includes ten mixer elements 50A, 50B, 50C, 50D, 50E, 50F, 50G, 50H, 50I, 50J. As explained in greater detail below, two or more separate fluids (e.g., gasses, liquids, and/or fluidized solids) enter the inlet end 12 of the housing 14, pass through the mixer assembly 18 and exit through the outlet end 30 as a substantially homogenous mixture. The mixer assembly 18 may combine materials with diffusion or emulsification. In other words, emulsification may be necessary when mixing immiscible fluids, and may be achieved by inducing stress within mixed fluids, thereby inducing fluid dispersion of immiscible droplets. In some embodiments, the mixer assembly 18 is received within a non-circular chamber (e.g., square, rectangular, oblong, etc.), in which case portions of the mixer assembly 18 (e.g., the corners) are removed to fit within the non-circular chamber. For example, the mixer assembly 18 may have corners removed so as to inscribe a square channel.

The mixer assembly 18 can be formed by the combination of mixer elements with various geometries in various orientations. The mixer assembly 18 is illustrated with ten mixer elements 50A-50G and are referenced sequentially in a downstream direction. The second mixer element 50B is positioned downstream in the material flow path from the first mixer element 50A. The third mixer element 50C is positioned downstream in the material flow path from the second mixer element 50B. The fourth mixer element 50D is positioned downstream in the material flow path from the third mixer element 50C. In the illustrated embodiment, the ten mixer elements 50A-50J are formed as a single integral unit (i.e., formed with an injection molding process, additive manufacturing, stamping, etc.). In some embodiments, the mixer assembly is formed by a plurality of mixer elements with the same, or similar, geometry.

Figure 3:
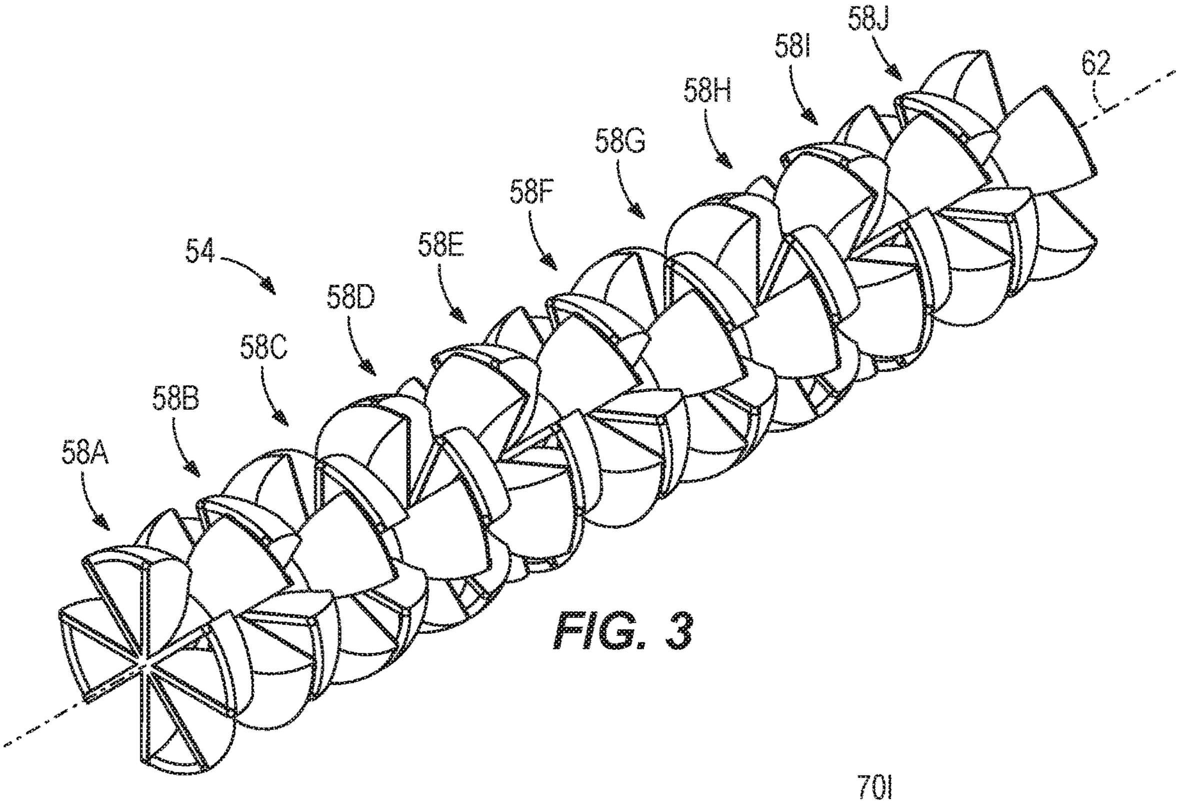
FIG. 3 is a perspective view of a mixer assembly according to another aspect of the disclosure.

With reference to FIG. 3, a mixer assembly 54 similar to the mixer assembly 18 is illustrated. The mixer assembly 54 includes ten mixer elements 58A-58J with the same structure and geometry. However, the second mixer element 58B is positioned in a different orientation as the first mixer element 58A and the third mixer element 58C is positioned in a different orientation as the second mixer element 58B. In other words, the mixer assembly 54 defines a longitudinal axis 62 and the mixer elements 58A-58J are positioned in different orientations rotationally about the longitudinal axis 62. For example, the second mixer element 58B is oriented with an approximately 30 degree rotation about the longitudinal axis 62 with respect to the first mixer element 58A, and the third mixer element 58C is oriented with an approximately 30 degree rotation about the longitudinal axis 62 with respect to the second mixer element 58B.

Figure 4:
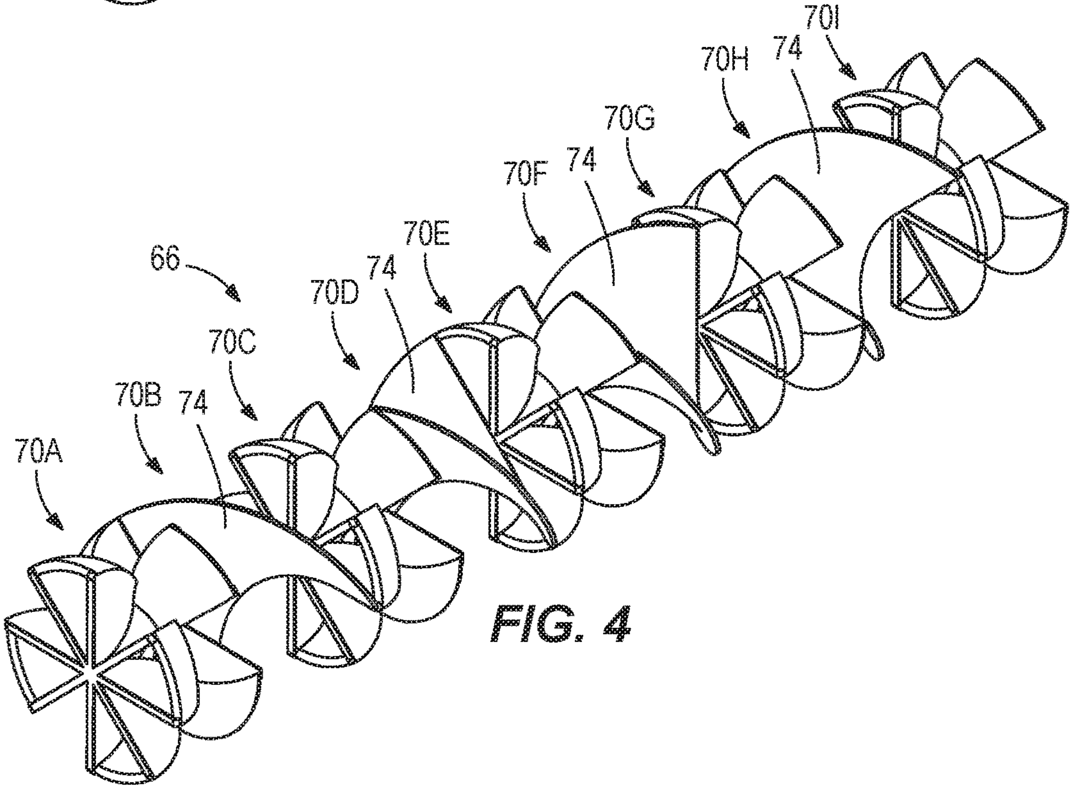
FIG. 4 is a perspective view of a mixer assembly according to another aspect of the disclosure.
Figure 5:
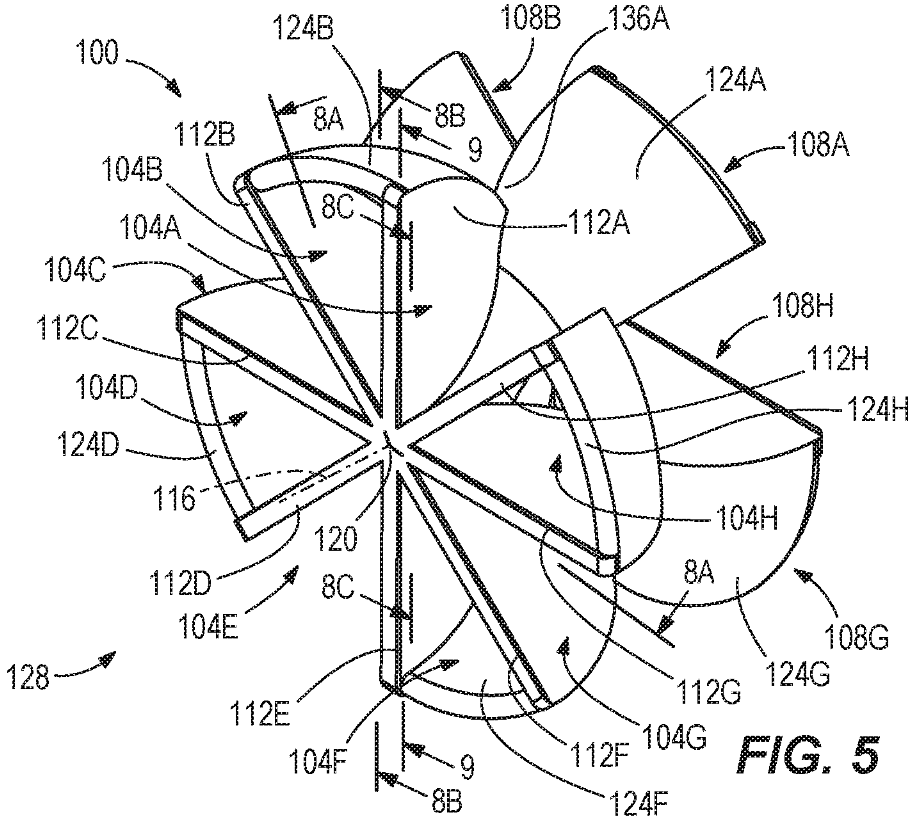
FIG. 5 is a front perspective view of a mixer element according to an aspect of the disclosure.
Figure 6:
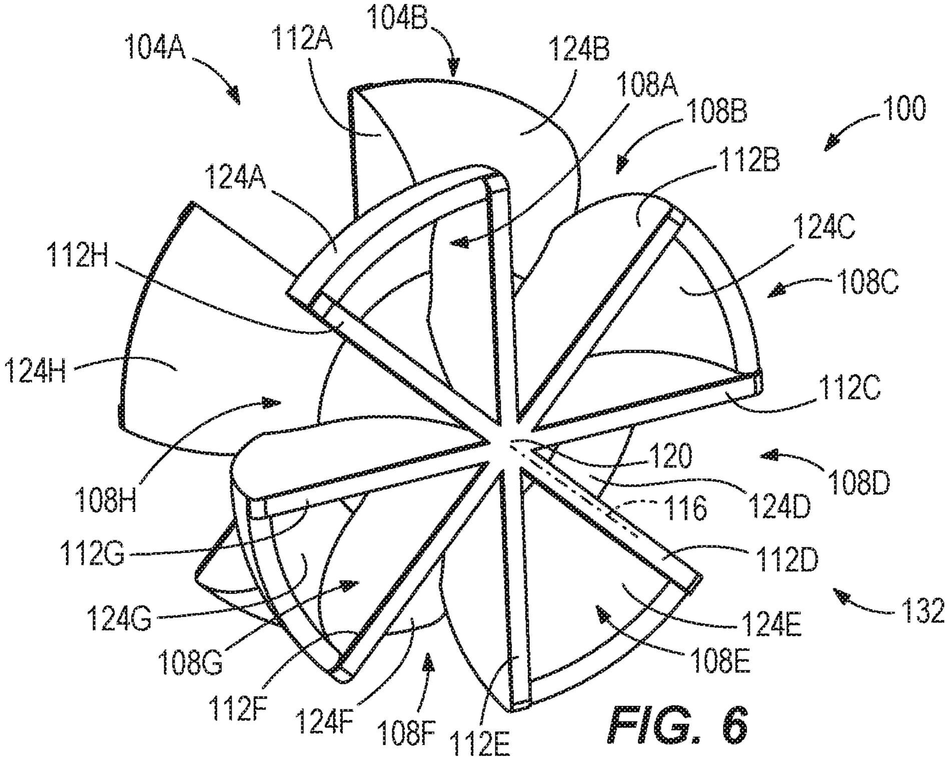
FIG. 6 is a rear perspective view of the mixer element of FIG. 5.
Figure 7:
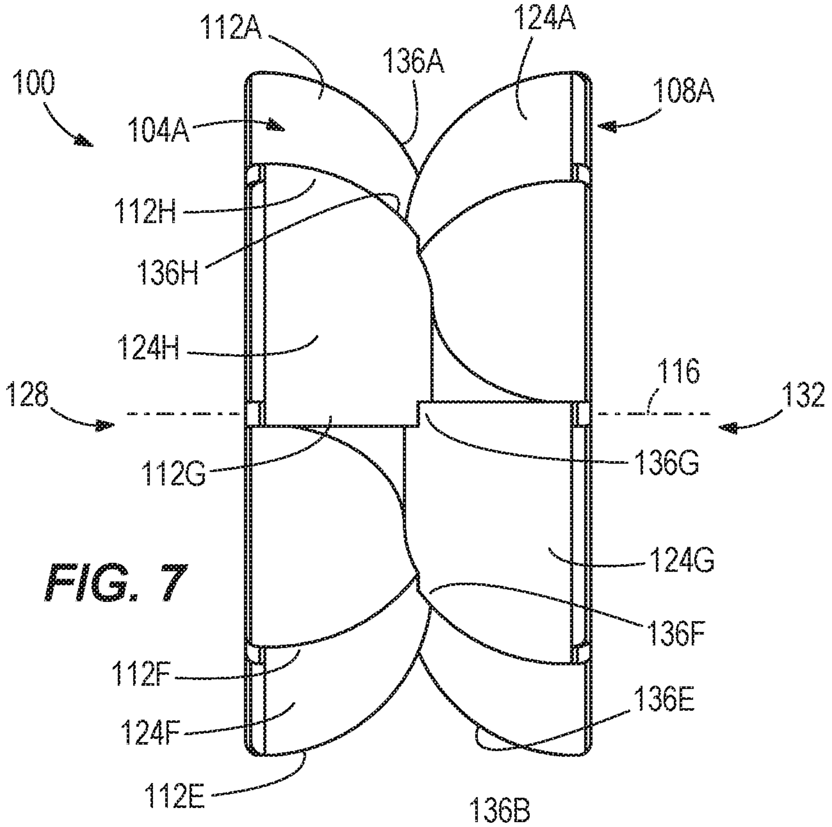
FIG. 7 is a side view of the mixer element of FIG. 5.

With reference to FIG. 4, a mixer assembly 66 similar to the mixer assembly 18 is illustrated. The mixer assembly 66 includes nine mixer elements 70A-70I. Mixer elements 70A, 70C, 70E, 70G, 70I have the same structure and geometry and the mixer elements 70B, 70D, 70F, 70H have the same structure and geometry that is different from the mixer elements 70A, 70C, 70E, 70G, 70I. The mixer elements 70B, 70D, 70F, 70H are positioned between the mixer elements 70A, 70C, 70E, 70G, 70I. Specifically, second mixer element 70B is positioned between the first mixer element 70A and the third mixer element 70C. Each of the mixer elements 70B, 70D, 70F, 70H include a helical baffle 74. In the illustrated embodiment, the helical baffle 74 twists approximately 90 degrees. In other embodiments, mixer elements with different geometries are combined to form a mixer assembly. Details and aspects of various mixer elements are discussed below.

With reference to FIGS. 5-9, a mixer element 100 includes eight inlet channels 104A, 104B, 104C, 104D, 104E, 104F, 104G, 104H and eight outlet channels 108A, 108B, 108C, 108D, 108E, 108F, 108G, 108H. The mixer element 100 further includes a plurality of dividing walls 112A, 112B, 112C, 112D, 112E, 112F, 112G, 112H. The dividing walls 112A-112H radially extend from a centerline 116. In the illustrated embodiment, the centerline 116 is also the longitudinal axis of the mixer element 100. In some embodiment, the portions of the dividing walls 112A-112H are coupled together to form a center hub 120 and the centerline 116 passes through the center hub 120. For example, the first dividing wall 112A is coupled to the second dividing wall 112B at the center hub 120. The outlet channels 108A-108H are aligned with the inlet channels 104A-104H along the centerline 116. For example, the first outlet channel 108A is aligned with the first inlet channel 104A along the centerline 116 and the second outlet channel 108B is aligned with the second inlet channel 104B along the centerline 116.

The mixer element 110 also includes guide walls 124A-124H that at least partially define the inlet channels 104A-104H and the outlet channels 108A-108H. For example, the first inlet channel 104A is at least partially defined by the first guide wall 124A and the second inlet channel 104B is at least partially defined by the second guide wall 124B. In the illustrated embodiment, the guide walls 124A-124H are non-linear. Specifically, the guide walls 124A-124H are S-shaped (i.e., generally in the shape of an "5"). More specifically, the guide walls 124A-124H in the illustrated embodiment are sigmoid-shaped (see FIGS. 8 and 9).

A first group of the guide walls (i.e., guide walls 124A, 124C, 124E, 124G) are oriented with respect to the centerline 116 differently than the remaining guide walls (i.e., guide walls 124B, 124D, 124F, 124H). Some of the inlet channels (i.e., inlet channels 104A, 104C, 104E, 104G) direct material away from the centerline 116 (i.e., radially outward) and the remaining inlet channels (i.e., inlet channels 104B, 104D, 104F, 104H) direct material toward the centerline 116 (i.e., radially inward). In other words, the inlet channels 104A, 104C, 104E, 104G are in-to-out channels and the inlet channels 104B, 104D, 104F, 104H are out-to-in channels. The inlet channels 104A, 104C, 104E, 104G may also be referred to as "distal channels" or "lateral channels" and the inlet channels 104B, 104D, 104F, 104H may be referred to as "proximal channels" or "medial channels". For example, material flowing through the first inlet channel 104A along the centerline 116 is directed by the first guide wall 124A to move away from the centerline 116. Material flowing through the second inlet channel 104B along the centerline 116 is directed by the second guide wall 124B to move toward the centerline 116. Material flowing through the third inlet channel 104C along the centerline 116 is directed by the third guide wall 124C to move away from the centerline 116.

The in-to-out channels 104A, 104C, 104E, 104G and the out-to-in channels 104B, 104D, 104F, 104H are positioned in an alternating fashion about the centerline 116. In particular, an out-to-in channel is positioned between two in-to-out channels. For example, the second inlet channel 104B (an out-to-in channel) is positioned between the first inlet channel 104A and the third inlet channel 104C (both in-to-out channels).

The outlet channels 108A-108H are similar to the inlet channels 104A-104H in that there are some in-to-out channels (i.e., outlet channels 108A, 108C, 108E, 108G) and some out-to-in channels (i.e., outlet channels 108B, 108D, 108F, 108H). In other words, some of the outlet channels (i.e., outlet channels 108A, 108C, 108E, 108G) direct material away from the centerline 116 (i.e., radially outward) and other of the outlet channels (i.e., outlet channels 108B, 108D, 108F, 108H) direct material toward the centerline 116 (i.e., radially inward).

With continued reference to FIGS. 5-9, the dividing walls 112A-112H are positioned between adjacent inlet channels and adjacent outlet channels. For example, the first dividing wall 112A is positioned between the first inlet channel 104A and the second inlet channel 104B. Likewise, the first dividing wall 112A is also positioned between the first outlet channel 108A and the second outlet channel 108B. The second dividing wall 112B is positioned between second inlet channel 104B and the third inlet channel 104C. Likewise, the second dividing wall 112B is also positioned between the second outlet channel 108B and the third outlet channel 108C. In the illustrated embodiment, the dividing walls 112A-112H extend from a first end 128 (i.e., an upstream end, an inlet end) of the mixer element 100 to a second end 132 (i.e., a downstream end, an outlet end). The dividing walls 112A-112H are equally spaced around the centerline 116 such that the inlet channels 104A-104H and the outlet channel 108A-108H span an equal amount about the centerline 116. In the illustrated embodiment, with eight dividing walls 112A-112H, the inlet channels 104A-104H and the outlet channels 108A-108H span approximately 45 degrees about the centerline 116.

In the illustrated embodiment the fifth inlet channel 104E is positioned radially opposite from the first inlet channel 104A about the centerline 116, and the sixth inlet channel 104F is positioned radially opposite from the second inlet channel 104B about the centerline 116. In other words, the fifth inlet channel 104E is positioned approximately 180 degrees about the centerline 116 from the first inlet channel 104A. Likewise, the sixth inlet channel 104F is positioned approximately 180 degrees about the centerline 116 from the second inlet channel 104B. The fifth dividing wall 112E is positioned between the fifth inlet channel 104E and the sixth inlet channel 104F. The fifth dividing wall 112E extends radially from the centerline 116. Specifically, the fifth dividing wall 112E is co-planar with the first dividing wall 112A. Likewise, the sixth dividing wall 112F is co-planar with the second dividing wall 112B.

The mixer element 100 further includes a plurality of openings 136A, 136B, 136C, 136D, 136E, 136F, 136G, 136H (i.e., radially outward openings) and a plurality of openings 140A, 140B, 140C, 140D, 140E, 140F, 140G, 140H (i.e., radially inward openings) formed in the dividing walls 112A-112H. For example, the opening 136A (i.e., a radially-outward opening) is formed in the first dividing wall 112A and the opening 140A (i.e., a radially-inward opening) is formed in the first dividing wall 112A. The opening 136A fluidly communicates the first inlet channel 104A and the second outlet channel 108B. The opening 140A fluidly communicates the second inlet channel 104B and the first outlet channel 108A. The radially outward openings (i.e., openings 136A-136H) are positioned farther away from the centerline 116 than the radially inward openings (i.e., 140A-140H). In the illustrated embodiment, each of the dividing walls (112A-112H) includes one of the radially outward openings (i.e., openings 136A-136H) and one of the radially inward openings (i.e., openings 140A-140H). For example, the opening 136B (i.e., a radially outward opening) and the opening 140B (i.e., a radially inward opening) are formed in the second dividing wall 112B. The openings 136A-136H may also be referred to as "distal openings" or "lateral openings" and the openings 140A-140H may be referred to as "proximal openings" or "medial openings." The inlet channels 104B, 104D, 104F, 104H (i.e., the out-to-in channels) and the outlet channels 108A, 108C, 108E, 108G (i.e., the in-to-out channels) intersect to form a central chamber 142. The radially inward the openings 140A-140H fluidly communicate with the central chamber 142. The centerline 116 passes through the central chamber 142.

Figure 8A:
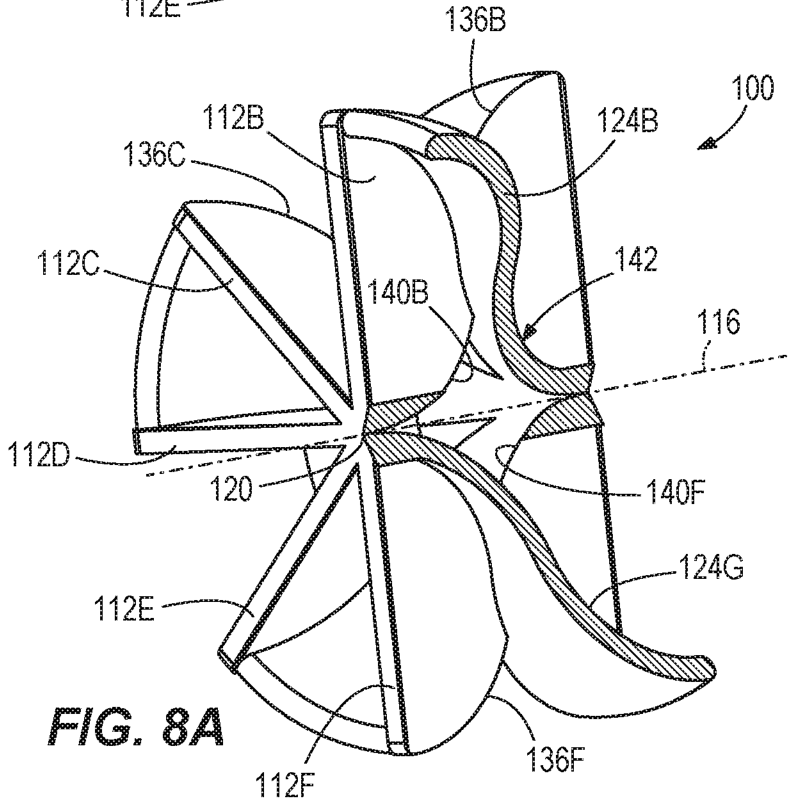
FIG. 8A is a cross-sectional view of the mixer element of FIG. 5, taken along the lines 8A-8A shown in FIG. 5.
Figure 8B:
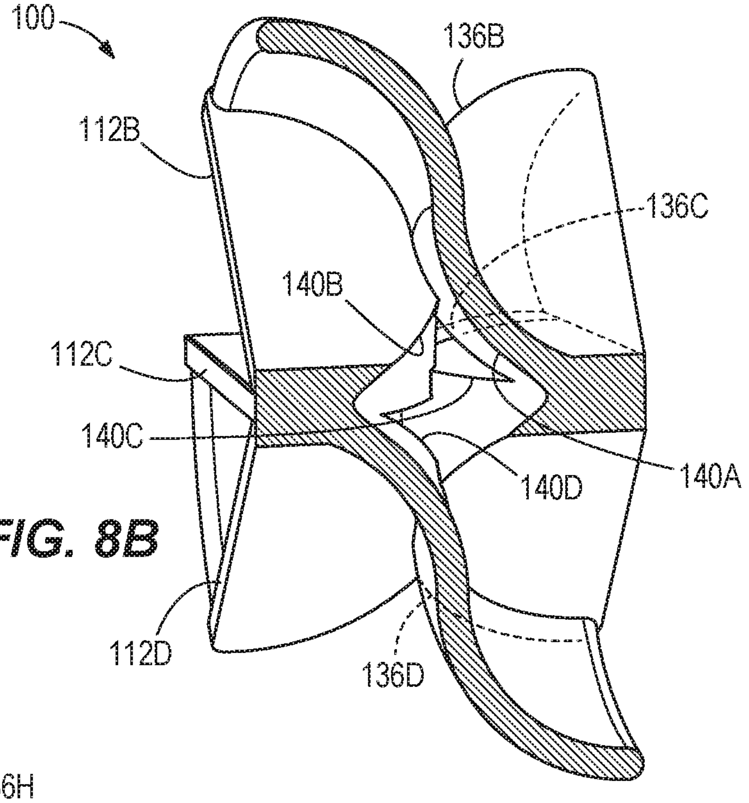
FIG. 8B is a cross-sectional view of the mixer element of FIG. 5, taken along lines 8B-8B shown in FIG. 5.
Figure 8C:
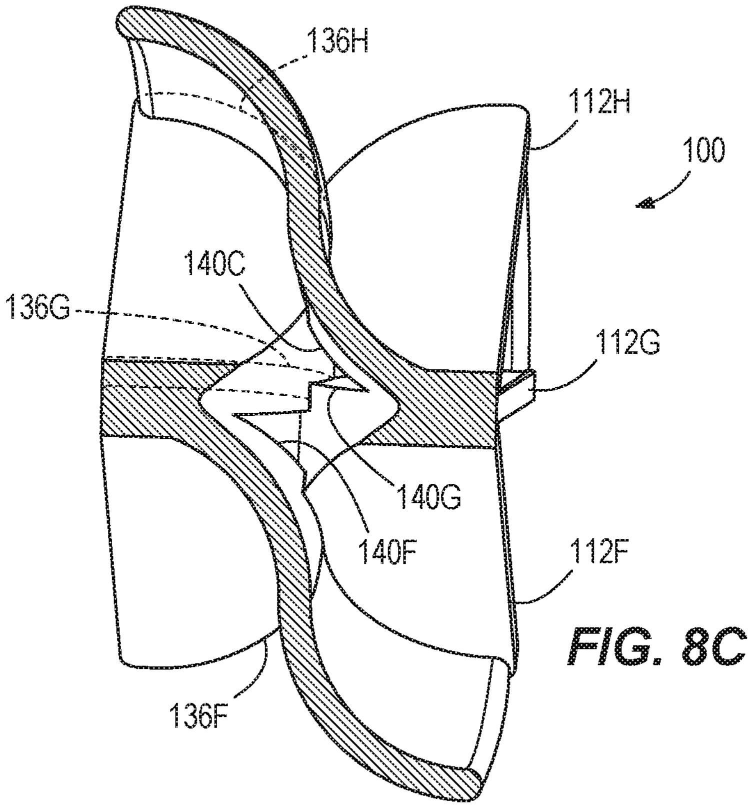
FIG. 8C is a cross-sectional view of the mixer element of FIG. 5, taken along lines 8C-8C shown in FIG. 5.

As discussed with reference to alternative embodiments herein, the openings 136A-136H, 140A-140H can be triangular-shaped, curved, concave, convex, cusp-shaped, tangent, etc. Although not all openings 136A-136H, 140A-140H may be visible in a given view, the positioning of the openings 135A-136H and 140A-140H on each of the dividing walls 112A-112H is identical. For example, with reference to FIG. 8A, the openings 136B, 140B formed in the dividing wall 112B and the openings 136F, 140F formed in the dividing wall 112F are illustrated. With the remaining openings positioned in similar positions on the remaining dividing walls, as illustrated in FIGS. 8B and 8C.

Figure 9:
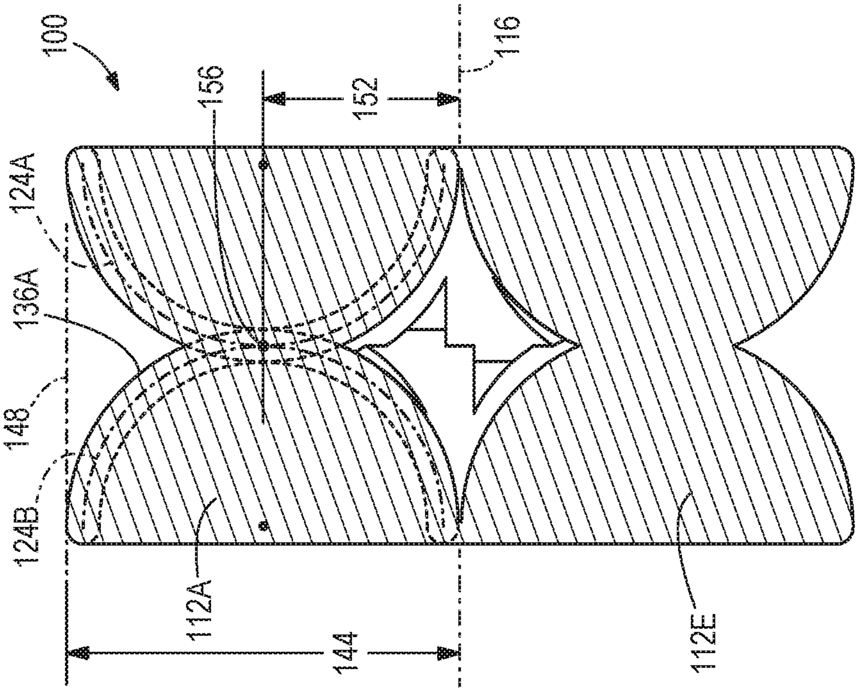
FIG. 9 is a cross-sectional view of the mixer element of FIG. 5, taken along lines 9-9 shown in FIG. 5

With reference to FIG. 9, the mixer element 100 defines a first distance 144 that is a radius measured from the centerline 116 to an outer extent 148 of the mixer element 100, and a second distance 152 that is measured from the centerline 116 to a point 156 where the first guide wall 124A and the second guide wall 124B overlap at the dividing wall 112A. A proximity ratio is defined as the ratio of the second distance 152 to the first distance 144 (i.e., distance 152/distance 144). In some embodiments, the ratio is within a range of approximately 0.5 to approximately 0.7. In the illustrated embodiment the ratio of the second distance 152 to the first distance 144 is approximately 0.5. In other words, the first guide wall 124A and the second guide wall 124B overlap on the first dividing wall 112A at the point 156 that is one half the radius 144 of the mixer element 100.

In operation of the mixer element 100, material entering the inlet channels 104A-104H is guided by the guide walls 124A-124H toward the openings 136A-136H and 140A-140H. The material then passes from the inlet channels 104A-104H through the openings 136A-136H and 140A-140H to the outlet channels 108A-108H. Specifically, the material flows from an inlet channel into an adjacent outlet channel through an opening. For example, material entering the inlet channel 104A is guided by the first guide wall 124A toward the opening 136A where the material then enters the second outlet channel 108B (i.e., an outlet channel adjacent the inlet channel). As such, the first inlet channel 104A is not in fluid communication with the first outlet channel 108A.

The mixer element 100 is a radial static mixer that reduces the amount of streaking that results from combining two materials. Because the mixer element 100 is circular, it can be applied to industrial applications in which a square-channel mixer is not possible. In addition, the radial design of the mixer element 100 is space efficient and allows for additional inlet and outlet channels than would otherwise be possible with a conventional mixer of the same size. Also, the radial design of the mixer element 100 improves manufacturability.

Figure 10:
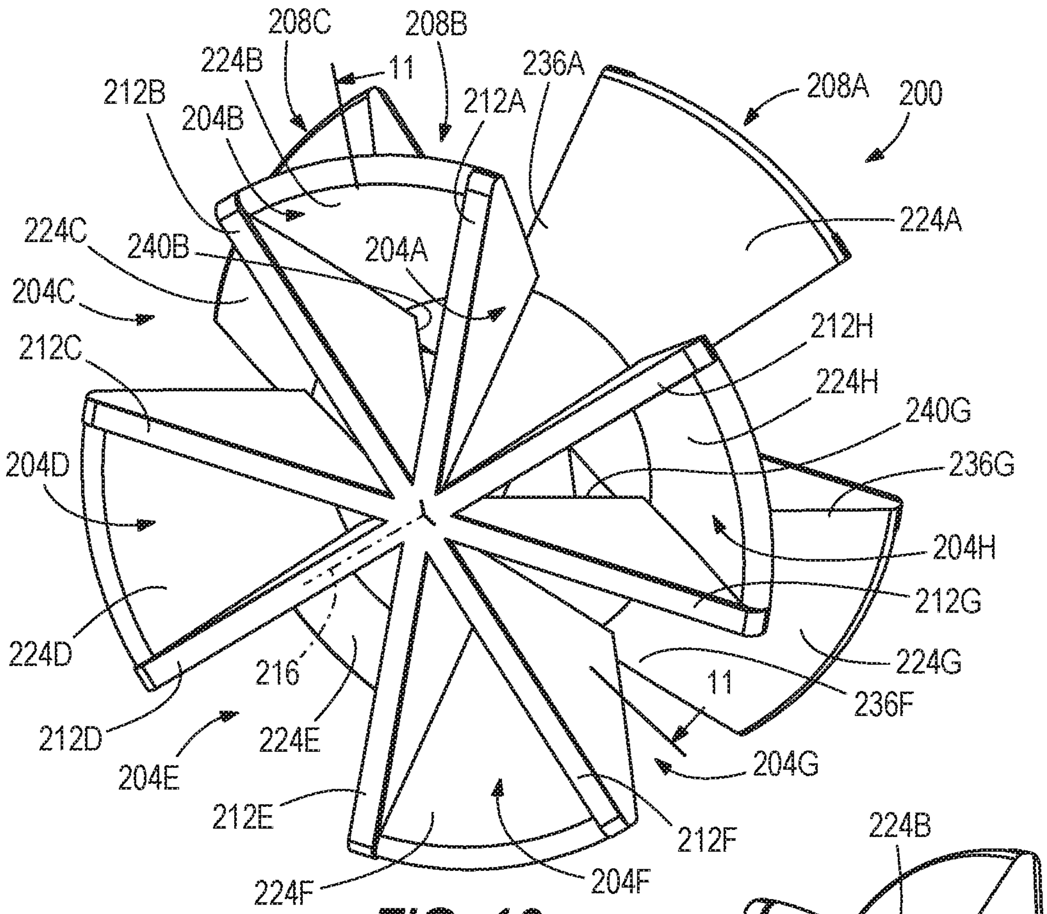
FIG. 10 is a perspective view of a mixer element according to an aspect of the disclosure.
Figure 11:
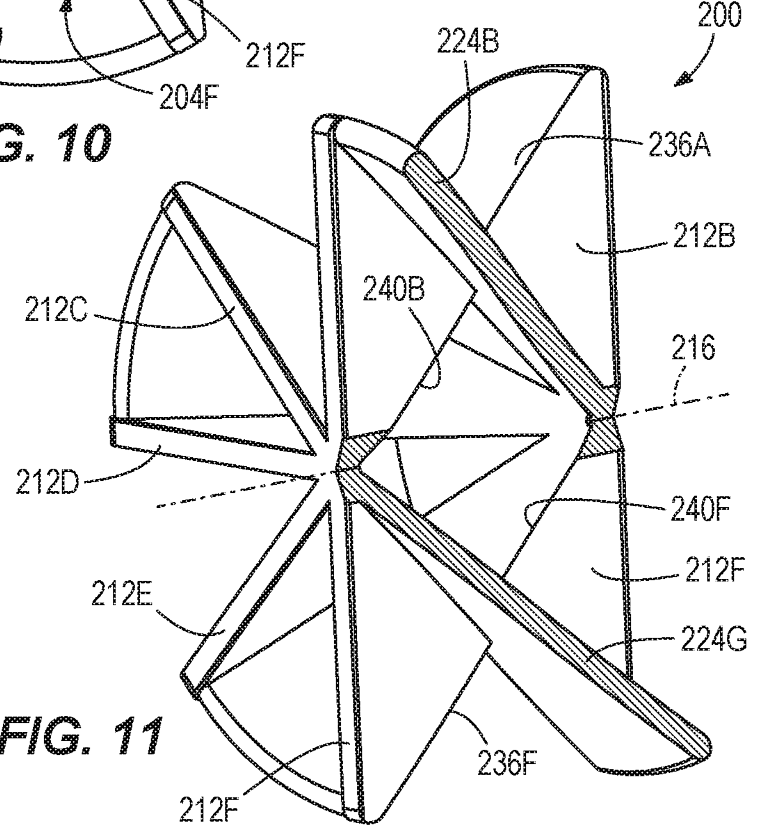
FIG. 11 is a cross-sectional view of the mixer element of FIG. 10, taken along the lines 11-11 shown in FIG. 10.

The mixer element 100 is described in detail above and various alternative embodiments are described herein with similar reference numerals. "X04" illustrates and represents an inlet channel in any given embodiment, where "X" is the embodiment number. For example, 204 represents an inlet channel for the mixer element 200 and 304 represents an inlet channel for the mixer element 300. Likewise, suffixes are used to illustrate and represent iterations of a feature within a given embodiment. For example, 104A is the first inlet channel, 104B is the second inlet channel, and so forth, for the mixer element 100. Also, 204A is the first inlet channel, 204B is the second inlet channel, and so forth, for the mixer element 200. In some instances, every iterations of the same feature in an embodiment may not be annotated for the sake of brevity and because any remaining iterations of that feature are similarly or identically situated as the ones described. For example, an opening 240B is illustrated in FIGS. 10 and 11, and the mixer element 200 further includes seven other similarly situated openings (e.g., openings 240A, 240C, 240D, 240E, 240F, 240G, 240H) that are iterations of the opening 240B and are symmetrically similarly situated. The alternative embodiments described herein utilize this reference numeral scheme to describe an embodiment as it relates to other embodiments described and as it relates to complementary or symmetrical aspects in the same embodiment.

With reference to FIGS. 10 and 11, a mixer element 200 similar to the mixer element 100 is illustrated with similar reference numerals from the mixer element 100 plus 100 are used to describe the mixer element 200. Only differences between the mixer element 200 and the mixer element 100 are described in detail herein. The mixer element 200 includes eight inlet channels 204A-204H positioned radially around a centerline 216 and eight outlet channels 208A-208H positioned radially around the centerline 216. A plurality of dividing walls 212A-212H radially extend from the centerline 216. The mixer element 200 includes guide walls 224A-224H. The guide walls 224A-224H at least partially define the inlet channels 204A-204H and the outlet channels 208A-208H. In the illustrated embodiment, the guide walls 224A-224H are linear. In other words, the guide walls 224-224H extend along a linear path.

Figure 12:
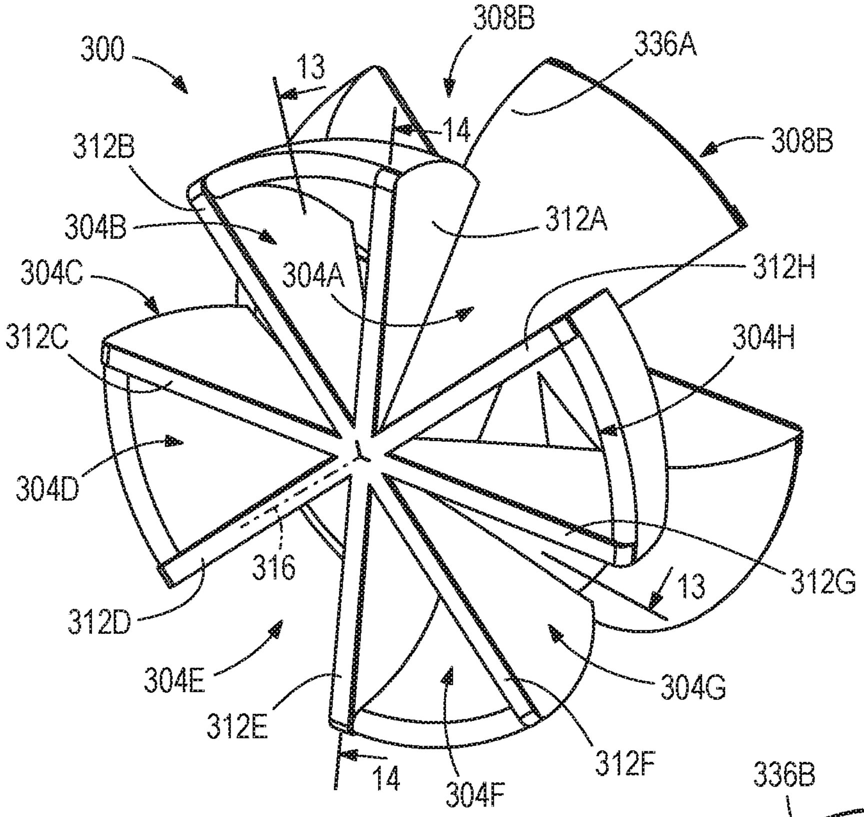
FIG. 12 is a perspective view of a mixer element according to an aspect of the disclosure.
Figure 13:
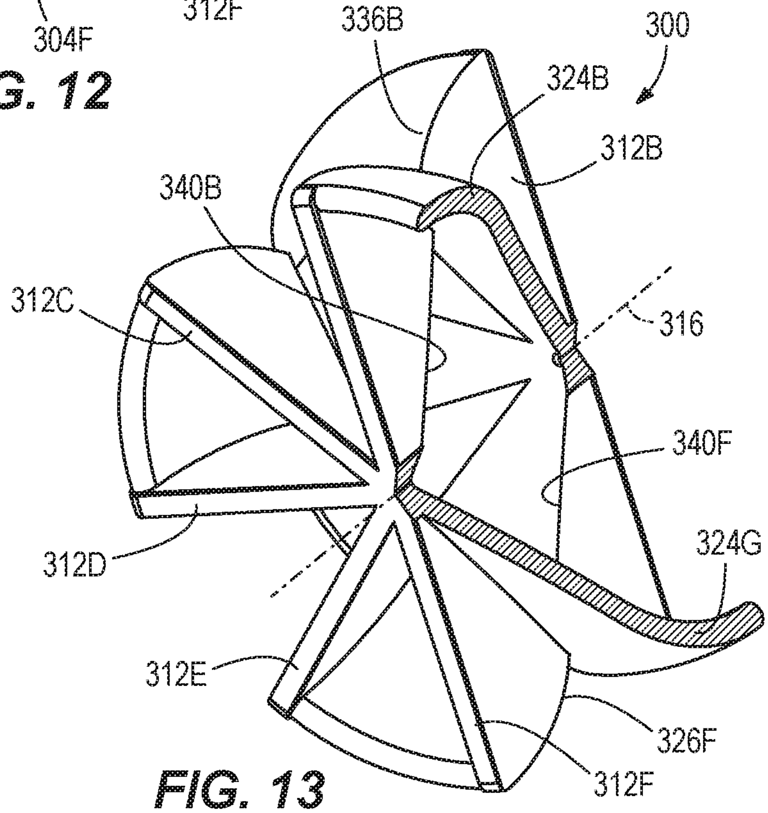
FIG. 13 is a cross-sectional view of the mixer element of FIG. 12, taken along the lines 13-13 shown in FIG. 12.

With reference to FIGS. 12 and 13, a mixer element 300 similar to the mixer element 100 is illustrated with similar reference numerals from the mixer element 100 plus 200 are used to describe the mixer element 400. Only differences between the mixer element 300 and the mixer element 100 are described in detail herein. The mixer element 300 includes eight inlet channels 304A-304H positioned radially around a centerline 316 and eight outlet channels 308A-308H positioned radially around the centerline 316. A plurality of dividing walls 312A-312H radially extend from the centerline 316. The mixer element 300 includes guide walls 324A-324H. The guide walls 324A-324H at least partially define the inlet channels 304A-304H and the outlet channels 308A-308H. In the illustrated embodiment, the guide walls 324A-324H are non-linear.

Figure 14:
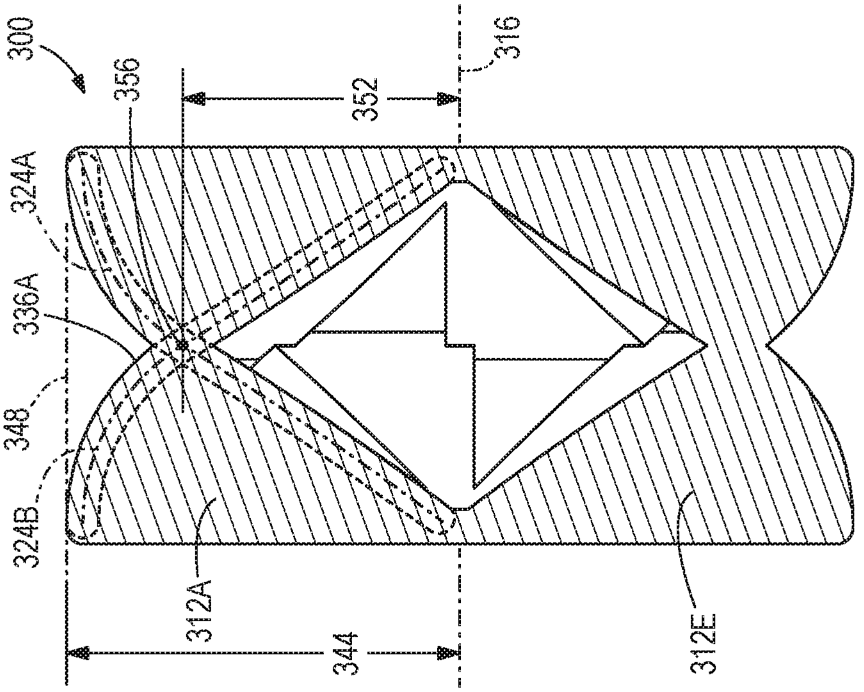
FIG. 14 is a cross-sectional view of the mixer element of FIG. 12, taken along the lines 14-14 shown in FIG. 12.

With reference to FIG. 14, the mixer element 300 defines a first distance 344 that is a radius measured from the centerline 316 to an outer extent 348 of the mixer element 300, and a second distance 352 that is measured from the centerline 316 to a point 356 where the first guide wall 324A and the second guide wall 324B overlap at the dividing wall 312A. A proximity ratio is defined as the ratio of the second distance 352 to the first distance 344 (i.e., distance 352/distance 344). In some embodiments, the ratio is within a range of approximately 0.5 to approximately 0.7. In the illustrated embodiment the ratio of the second distance 352 to the first distance 344 is approximately 0.7. In other words, the first guide wall 324A and the second guide wall 324B overlap on the first dividing wall 312A at the point 356 that is seventy percent the radius 344 of the mixer element 300.

Figure 15:
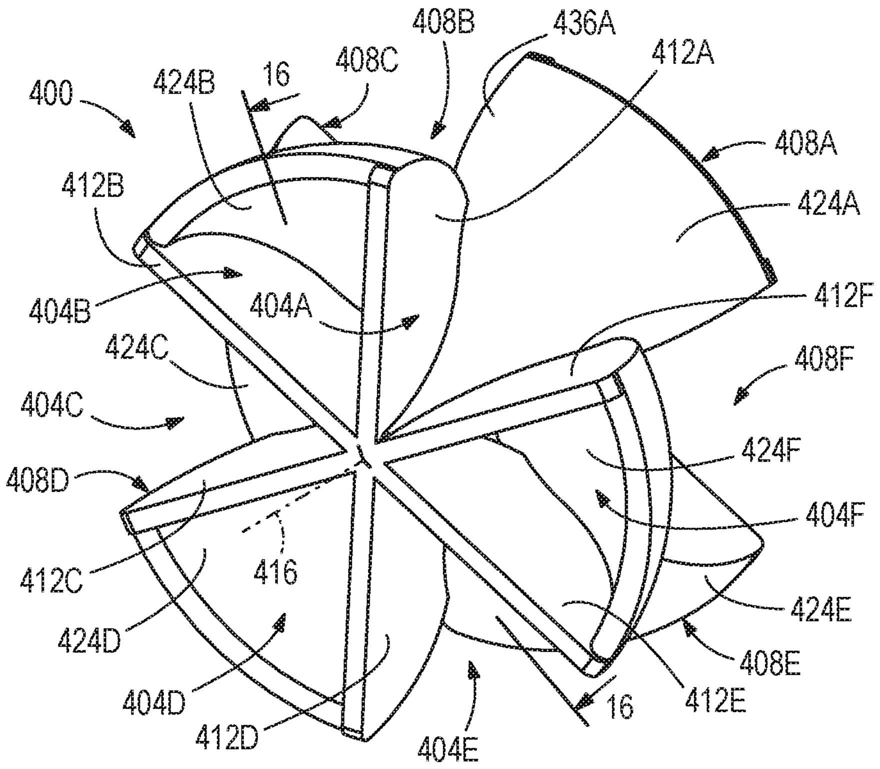
FIG. 15 is a perspective view of a mixer element according to an aspect of the disclosure.
Figure 16:
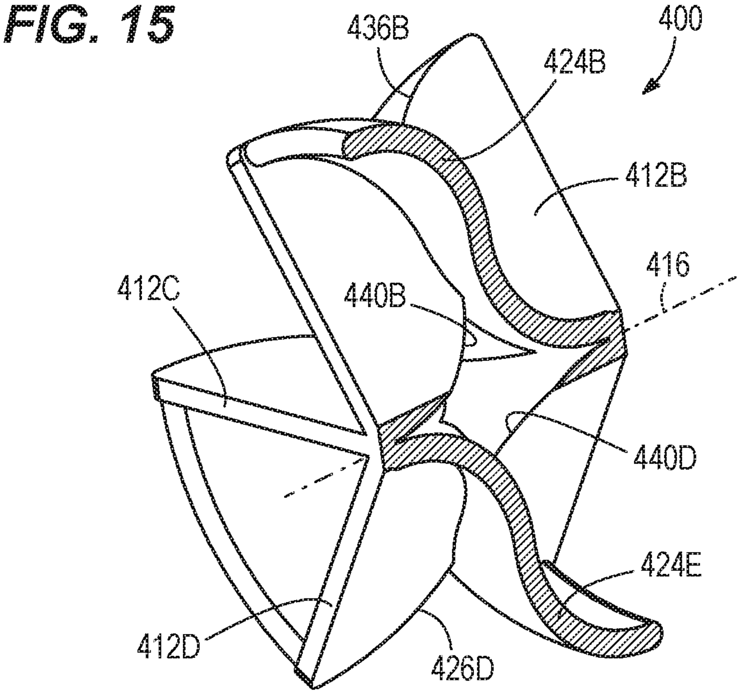
FIG. 16 is a cross-sectional view of the mixer element of FIG. 15, taken along the lines 16-16 shown in FIG. 15.

With reference to FIGS. 15 and 16, a mixer element 400 similar to the mixer element 100 is illustrated with similar reference numerals from the mixer element 100 plus 300 are used to describe the mixer element 400. Only differences between the mixer element 400 and the mixer element 100 are described in detail herein. The mixer element 400 includes six inlet channels 404A, 404B, 404C, 404D, 404E, 404F positioned radially around a centerline 416 and six outlet channels 408A, 408B, 408C, 408D, 408E, 408F positioned radially around the centerline 416. A plurality of dividing walls 412A-412F radially extend from the centerline 416. The mixer element 400 includes guide walls 424A-424F. The guide walls 424A-424F are non-linear and at least partially define the inlet channels 404A-404F and the outlet channels 408A-408F. In the illustrated embodiment, the number of inlet channels is six and the number of outlet channels is six.

Figure 17:
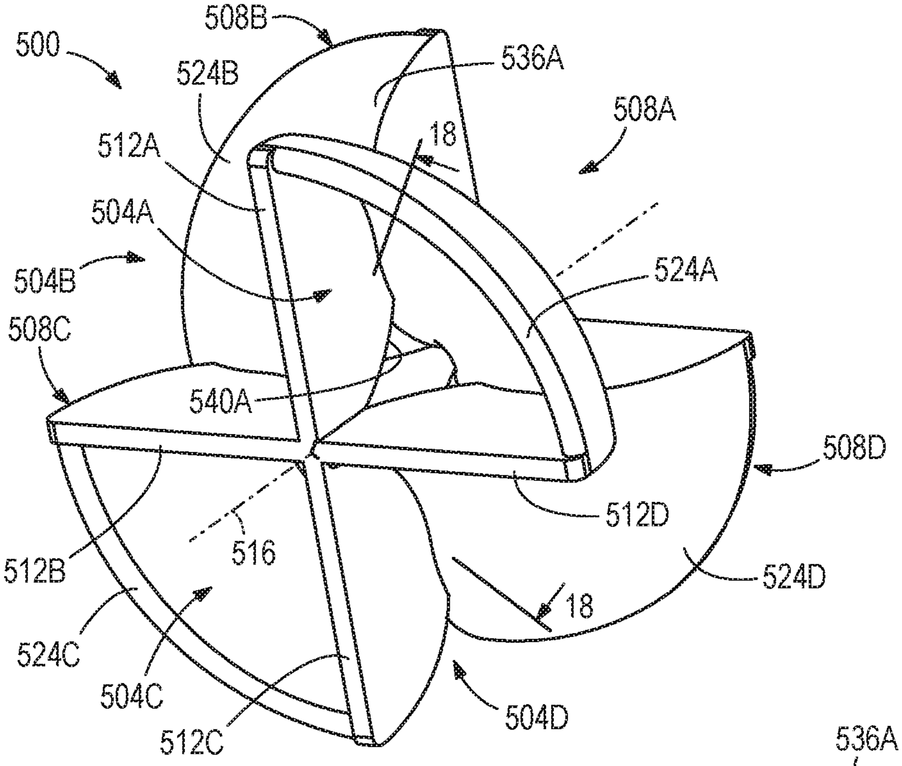
FIG. 17 is a perspective view of a mixer element according to an aspect of the disclosure.
Figure 18:
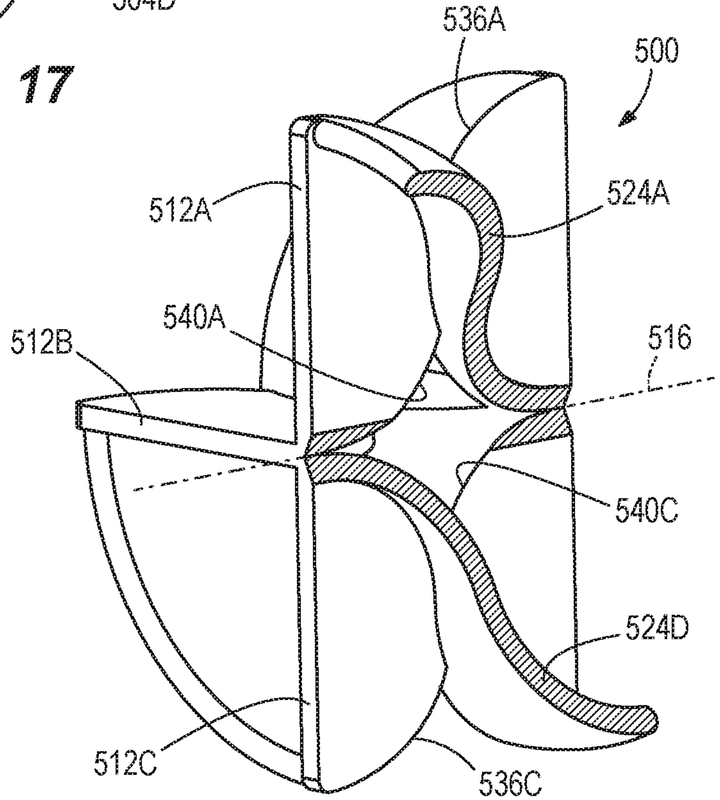
FIG. 18 is a cross-sectional view of the mixer element of FIG. 17, taken along the lines 18-18 shown in FIG. 17.

With reference to FIGS. 17 and 18, a mixer element 500 similar to the mixer element 100 is illustrated with similar reference numerals from the mixer element 100 plus 400 are used to describe the mixer element 500. Only differences between the mixer element 500 and the mixer element 100 are described in detail herein. The mixer element 500 includes four inlet channels 504A, 504B, 504C, 504D positioned radially around a centerline 516 and four outlet channels 508A, 508B, 508C, 508D positioned radially around the centerline 516. A plurality of dividing walls 512A-512D radially extend from the centerline 516. The mixer element 500 includes guide walls 524A-524D. The guide walls 524A-524D are non-linear and at least partially define the inlet channels 504A-504D and the outlet channels 508A-508D. In the illustrated embodiment, the number of inlet channels is four and the number of outlet channels is four.

As illustrated with the mixer elements 100, 400, and 500, alternative mixer elements may include seven or fewer inlet channels and seven or fewer outlet channels. In further alternatives, the mixer elements may include nine or more inlet channels and nine or more outlet channels.

Figure 19:
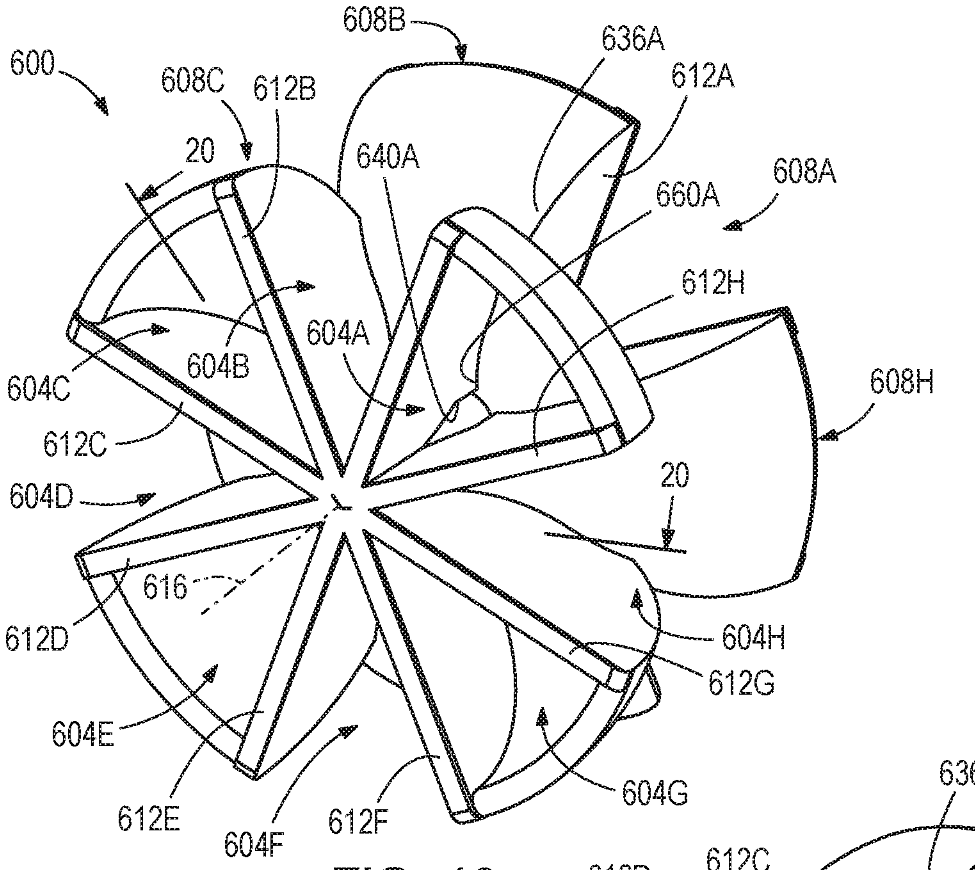
FIG. 19 is a perspective view of a mixer element according to an aspect of the disclosure.
Figure 20:
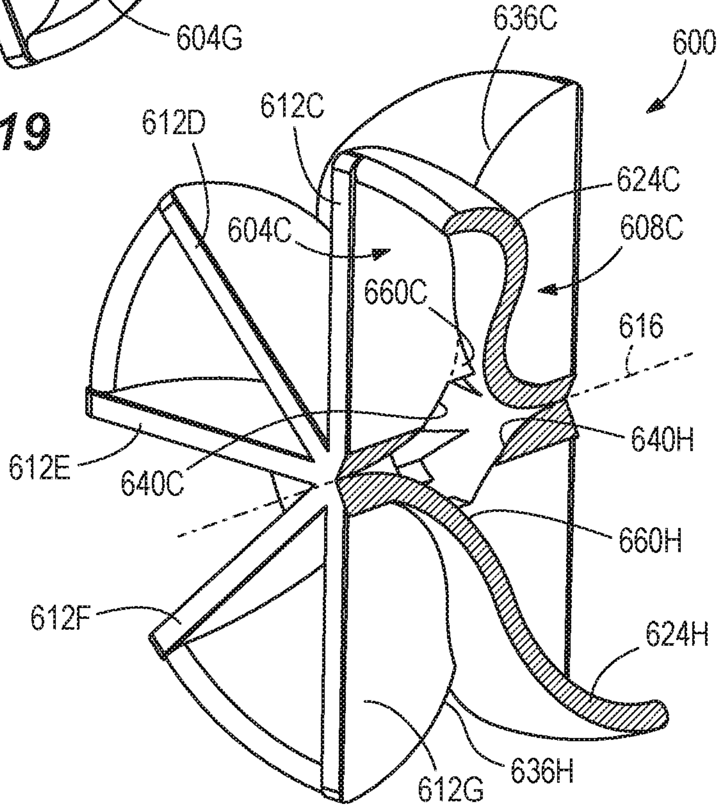
FIG. 20 is a cross-sectional view of the mixer element of FIG. 19, taken along lines 20-20 shown in FIG. 19.
Figure 21:
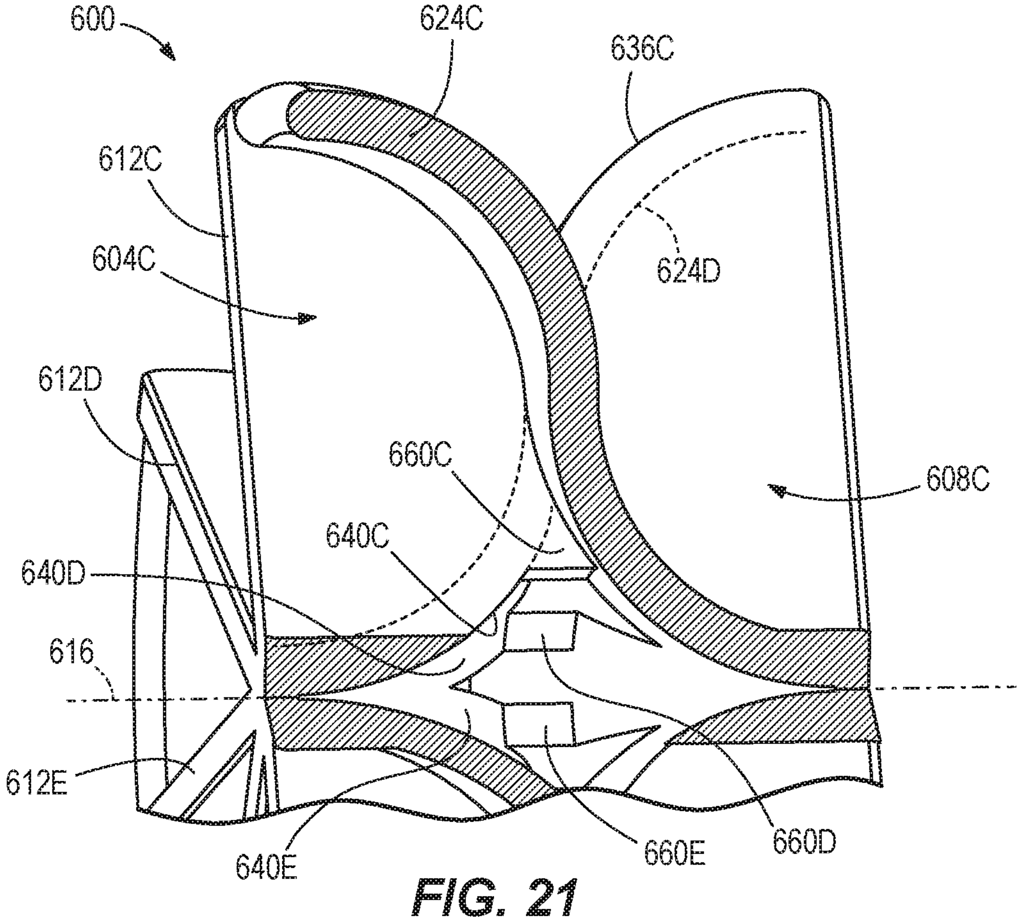
FIG. 21 is an enlarged partial view of the cross-section of FIG. 120.

With reference to FIGS. 19-21, a mixer element 600 similar to the mixer element 100 is illustrated with similar reference numerals from the mixer element 100 plus 500 are used to describe the mixer element 600. Only differences between the mixer element 600 and the mixer element 100 are described in detail herein. The mixer element 600 includes eight inlet channels 604A-604H positioned radially around a centerline 616 and eight outlet channels 608A-608H positioned radially around the centerline 616. A plurality of dividing walls 612A-612H radially extend from the centerline 616. The mixer element 600 includes guide walls 624A-624H. The guide walls 624A-624D are non-linear. In the illustrated embodiment, an opening 636A (i.e., a radially outward opening) is formed in the first dividing wall 612A between the first inlet channel 604A and the second outlet channel 608B. An opening 640A (i.e., a radially inward opening) is formed in the first dividing wall 612A between the second inlet channel 604B and the first outlet channel 608A. The first dividing wall 612A includes a flange 660A at least partially defining the opening 640A. In total, there is a flange 660A, 660B, 660C, 660D, 660E, 660F, 660G, 660H formed on each of the corresponding dividing walls 612A-612H that at least partially define each of the corresponding openings 640A-640H. With reference to FIGS. 20 and 21, the flange 660C is illustrated and the remaining flanges are similarly situated on their corresponding dividing walls. In the illustrated embodiment, the flange 660C is triangular-shaped. The flange 660C is defined as the material in the dividing wall 612C that impedes the flow of material through the opening 640C.

Figure 22:
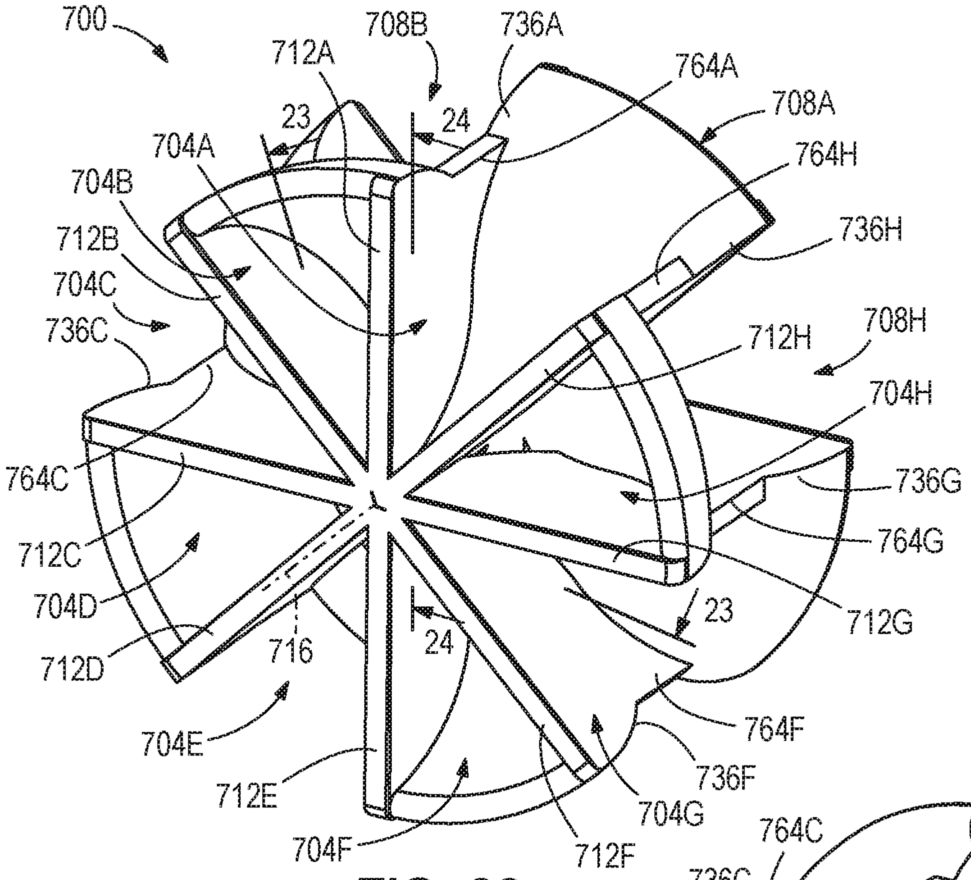
FIG. 22 is a perspective view of a mixer element according to an aspect of the disclosure.
Figure 23:
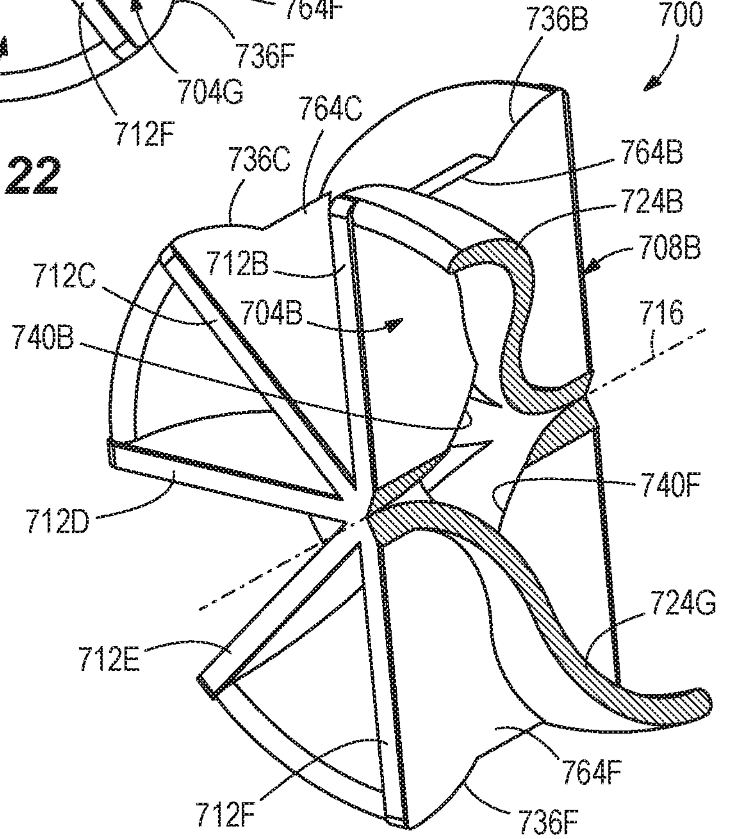
FIG. 23 is a cross-sectional view of the mixer element of FIG. 22, taken along lines 23-23 shown in FIG. 22.
Figure 24:
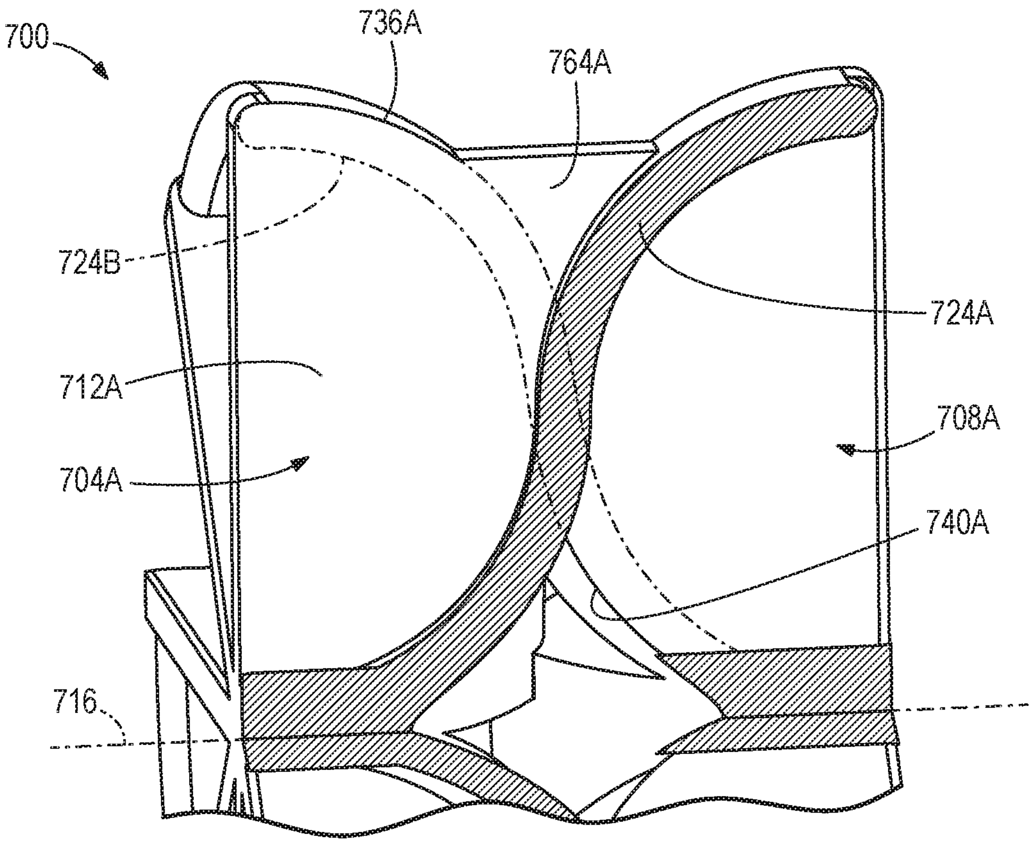
FIG. 24 is an enlarged partial cross-sectional view of the mixer element of FIG. 22, taken along lines 24-24 shown in FIG. 22.

With reference to FIGS. 22-24, a mixer element 700 similar to the mixer element 100 is illustrated with similar reference numerals from the mixer element 100 plus 600 are used to describe the mixer element 700. Only differences between the mixer element 700 and the mixer element 100 are described in detail herein. The mixer element 700 includes eight inlet channels 704A-704H positioned radially around a centerline 716 and eight outlet channels 708A-708H positioned radially around the centerline 716. A plurality of dividing walls 712A-712H radially extend from the centerline 716. The mixer element 700 includes guide walls 724A-724H. The guide walls 724A-724D are non-linear. In the illustrated embodiment, an opening 736A (i.e., a radially outward opening) is formed in the first dividing wall 712A between the first inlet channel 704A and the second outlet channel 708B. An opening 740A (i.e., a radially inward opening) is also formed in the first dividing wall 712A between the second inlet channel 704B and the first outlet channel 708A. The first dividing wall 712A includes a flange 764A at least partially defining the opening 746A. In total, there is a flange 764A, 764B, 764C, 764D, 764E, 764F, 764G, 764H formed on each of the corresponding dividing walls 712A-712H that at least partially define each of the corresponding openings 736A-736H. With reference to FIG. 24, the flange 764A, is illustrated and the remaining flanges are similarly situated on their corresponding dividing walls. In the illustrated embodiment, the flange 764A is triangular-shaped. The flange 764A is defined as the material in the dividing wall 712A that impedes the flow of material through the opening 736A.

Figure 25:
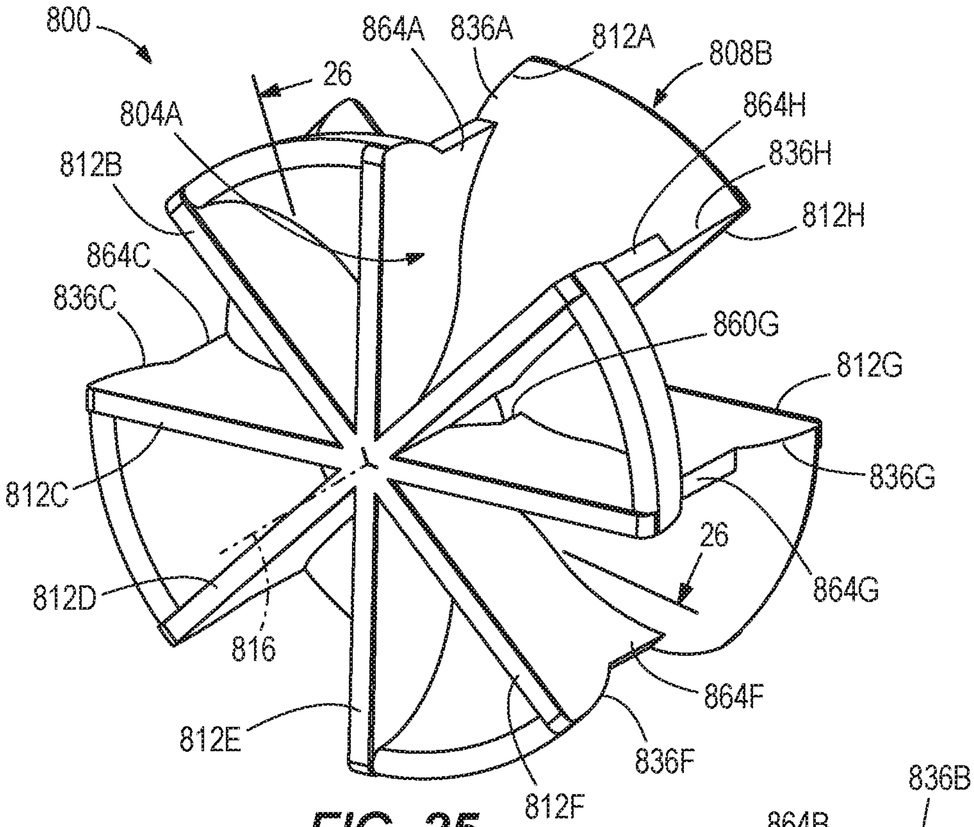
FIG. 25 is a perspective view of a mixer element according to an aspect of the disclosure.
Figure 26:
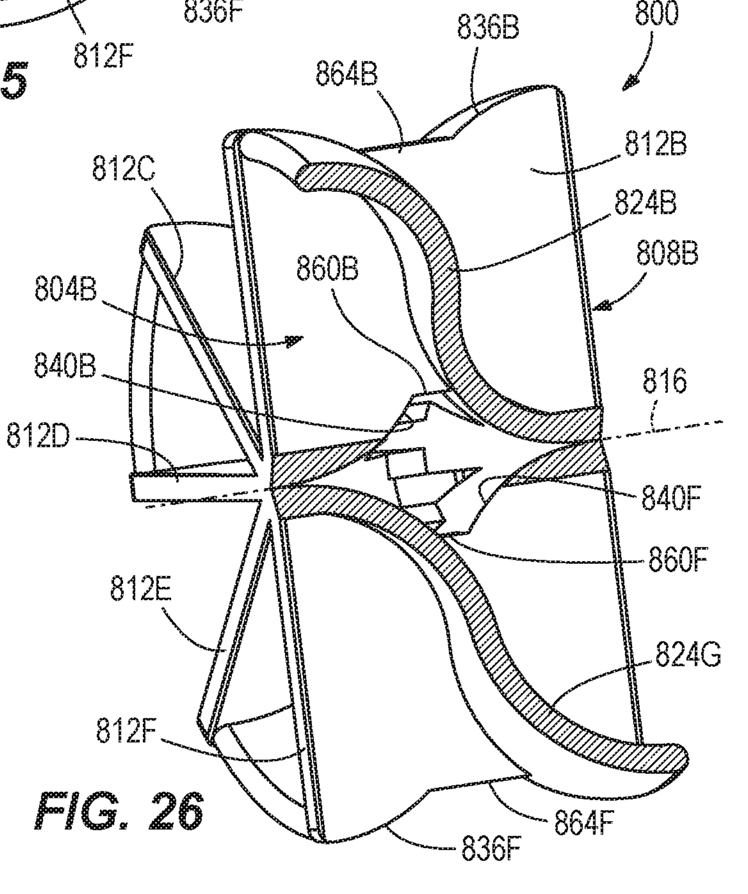
FIG. 26 is a cross-sectional view of the mixer element of FIG. 25, taken along lines 26-26 shown in FIG. 25.

With reference to FIGS. 25 and 26, a mixer element 800 similar to the mixer element 100 is illustrated with similar reference numerals from the mixer element 100 plus 700 are used to describe the mixer element 800. Only differences between the mixer element 800 and the mixer element 100 are described in detail herein. The mixer element 800 includes a dividing wall 812B that include a flange 860B at least partially defining the opening 840B (i.e., a radially inward opening) and a flange 864B at least partially defining the opening 836B (i.e., a radially outward opening). In the illustrated embodiment, the flange 860B and 864B are triangular-shaped. In total, the mixer element 800 includes a flange 860A-860H similar to flange 860B and a flange 864A-864H similar to flange 864B formed on each of the corresponding dividing walls 812A-812H that at least partially define each of the corresponding openings 836A-836H and 840A-840H. In other words, the flange 860B and the flange 864B are illustrated in detail in FIG. 26 and the remaining flanges are similarly situated on their corresponding dividing walls.

Figure 27:
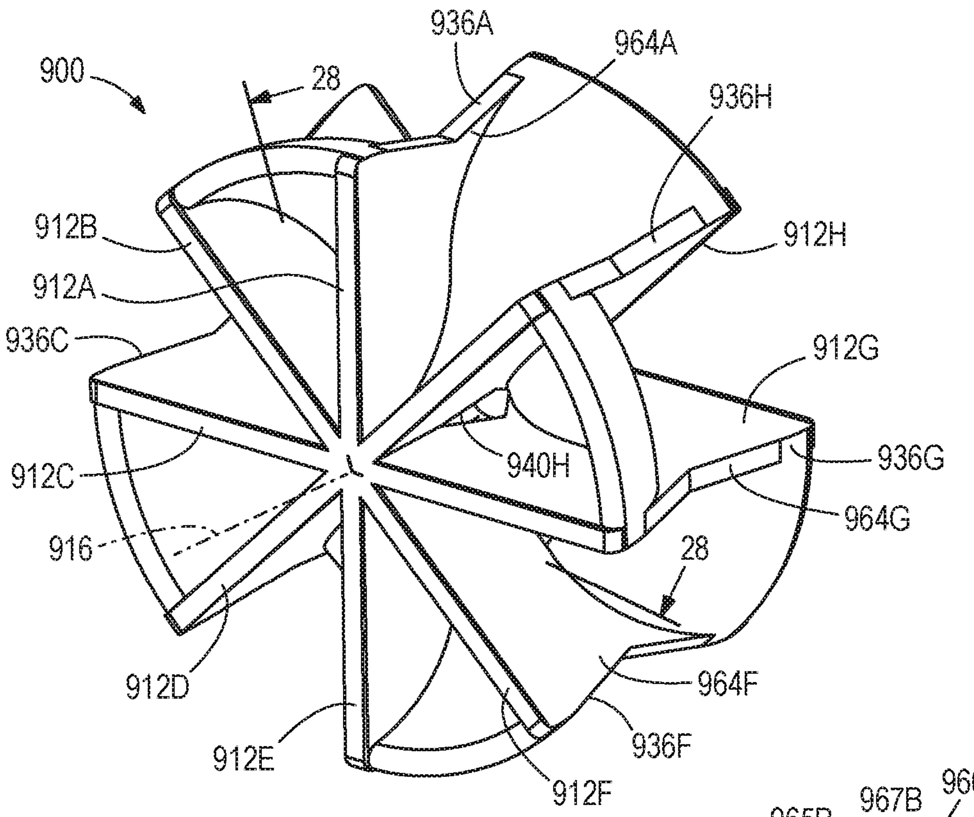
FIG. 27 is a perspective view of a mixer element according to an aspect of the disclosure.
Figure 28:
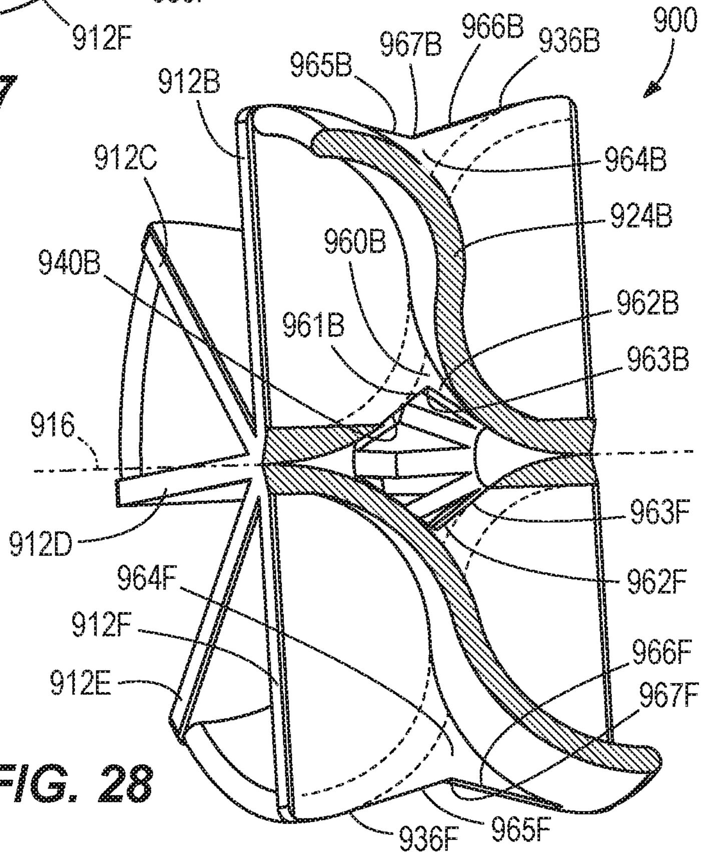
FIG. 28 is a cross-sectional view of the mixer element of FIG. 27, taken along lines 28-28 shown in FIG. 27.

With reference to FIGS. 27 and 28, a mixer element 900 similar to the mixer element 100 is illustrated with similar reference numerals from the mixer element 100 plus 800 are used to describe the mixer element 900. Only differences between the mixer element 900 and the mixer element 100 are described in detail herein. The mixer element 900 includes flanges 960A-960H and flanges 964A-964H similar to the flanges 860A-860H and the flanges 864A-864H, respectively, of the mixer element 800. However, the flanges 960A-960H are shaped so that the openings 940A-940H are triangular-shaped. Likewise, the flanges 964A-964H are shaped so that the openings 936A-936H are triangular-shaped. For example, the flange 964B includes a first portion 965B on one side of the opening 936B and a second portion 966B on the other side of the opening 936B. The two portions 965B, 966B meet to form an edge 967B. In other words, the flange 964B is a linear concave flange. Likewise, the flange 960B includes a first portion 961B on one side of the opening 940B and a second portion 962B on the other side of the opening 940B. The two portions 961B, 962B meet to form an edge 963B. In other words, the flange 960B is a linear concave flange.

Figure 29:
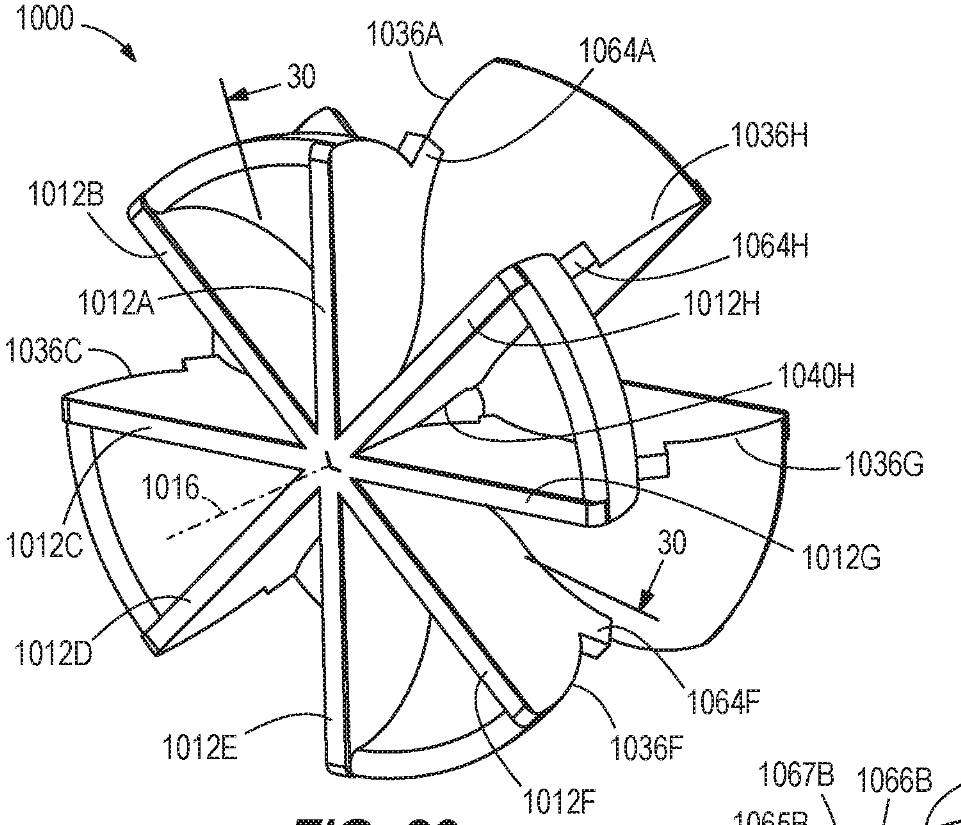
FIG. 29 is a perspective view of a mixer element according to an aspect of the disclosure.
Figure 30:
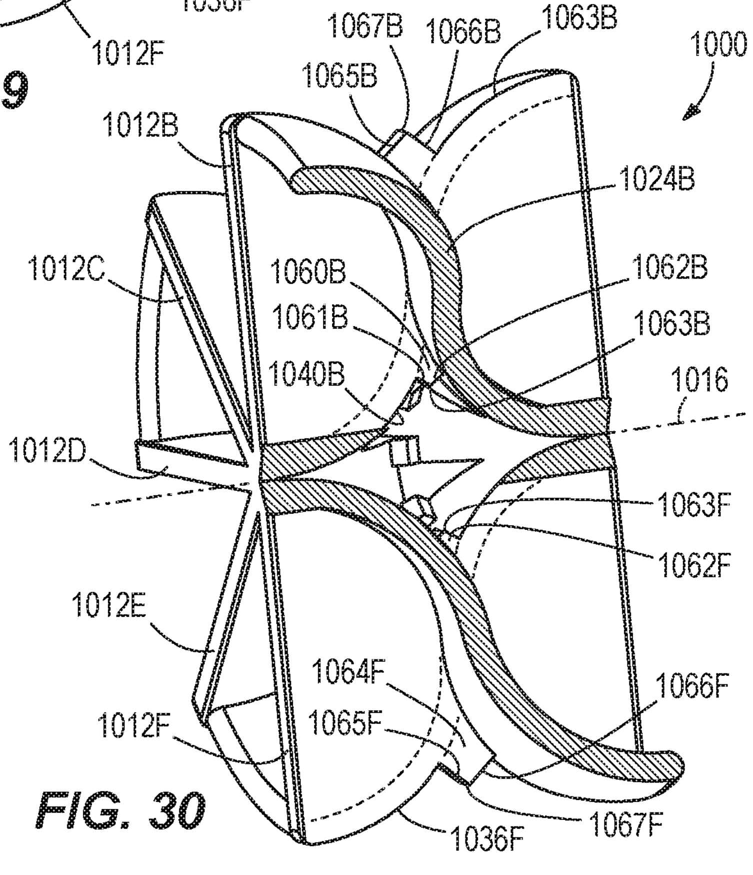
FIG. 30 is a cross-sectional view of the mixer element of FIG. 29, taken along lines 30-30 shown in FIG. 29.

With reference to FIGS. 29 and 30, a mixer element 1000 similar to the mixer element 100 is illustrated with similar reference numerals from the mixer element 100 plus 900 are used to describe the mixer element 1000. Only differences between the mixer element 1000 and the mixer element 100 are described in detail herein. The mixer element 1000 includes flanges 1060A-1060H and flanges 1064A-1064H similar to the flanges 960A-960H and the flanges 964A-964H, respectively, of the mixer element 900. However, the flanges 1060A-1060H are linear convex flanges and the flanges 1064A-1064H are linear convex flanges. For example, the flange 1064B includes a first portion 1065B on one side of the opening 1036B and a second portion 1066B on the other side of the opening 1036B. The two portions 1065B, 1066B meet to form an edge 1067B. In other words, the flange 1064B is a linear convex flange. Likewise, the flange 1060B includes a first portion 1061B on one side of the opening 1040B and a second portion 1062B on the other side of the opening 1040B. The two portions 1061B, 1062B meet to form an edge 1063B. In other words, the flange 1060B is a linear convex flange.

Figure 31:
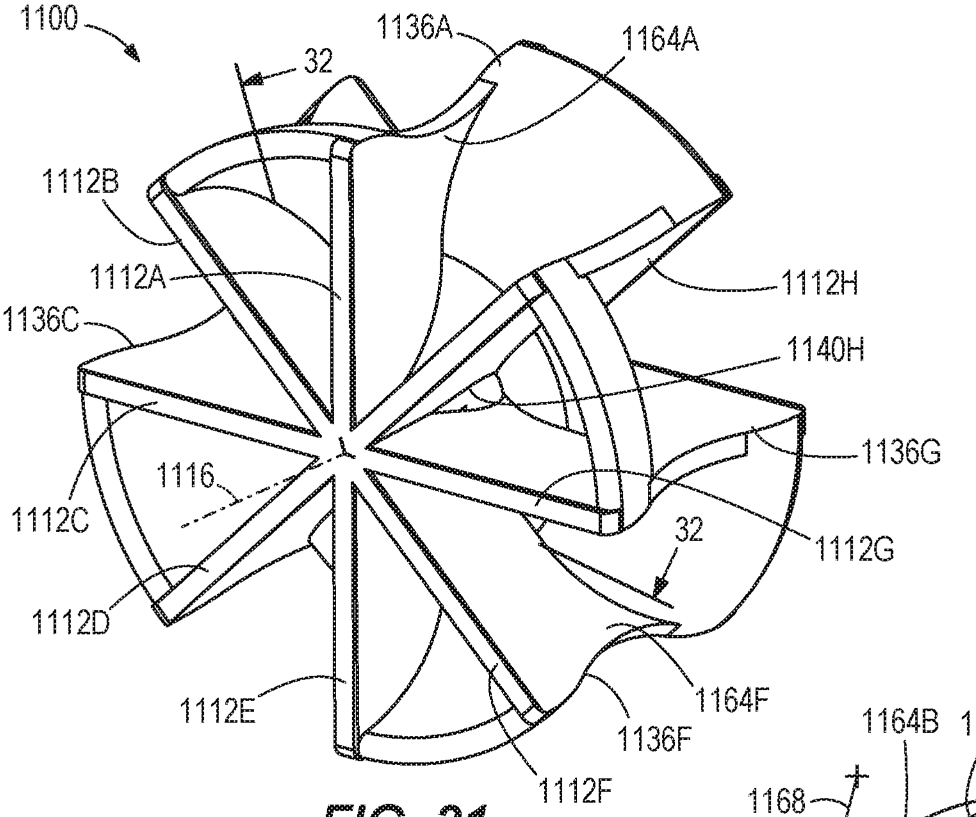
FIG. 31 is a perspective view of a mixer element according to an aspect of the disclosure.
Figure 32:
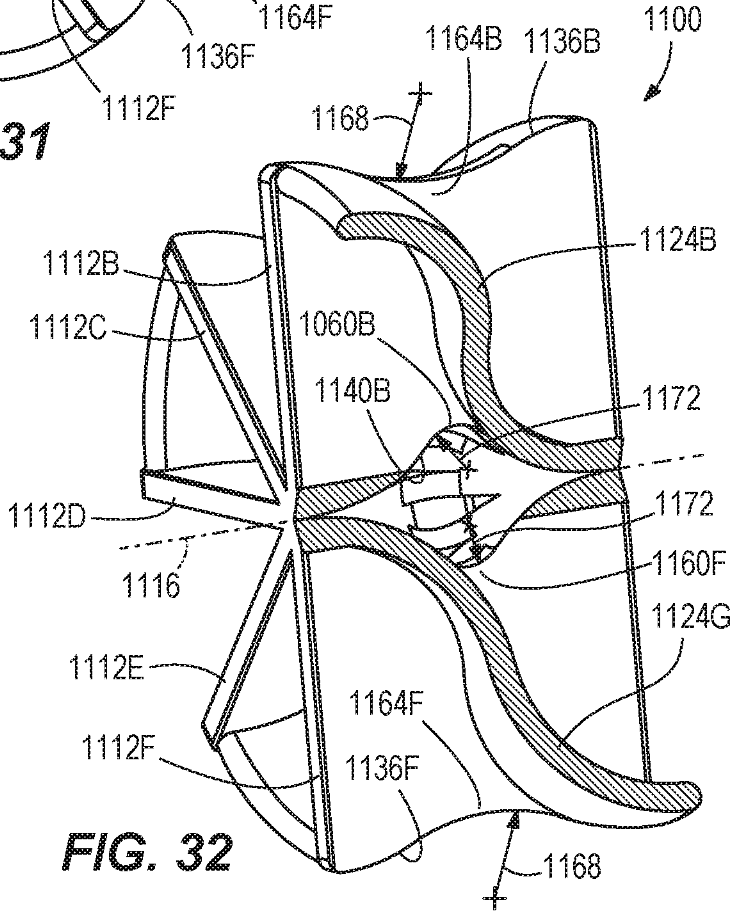
FIG. 32 is a cross-sectional view of the mixer element of FIG. 31, taken along lines 32-32 shown in FIG. 31.

With reference to FIGS. 31 and 32, a mixer element 1100 similar to the mixer element 100 is illustrated with similar reference numerals from the mixer element 100 plus 1000 are used to describe the mixer element 1100. Only differences between the mixer element 1100 and the mixer element 100 are described in detail herein. The mixer element 1100 includes flanges 1160A-1160H and flanges 1164A-1164H similar to the flanges 960A-960H and the flanges 964A-964H, respectively, of the mixer element 900. However, the flanges 1160A-1160H are radial concave flanges and the flanges 1164A-1164H are radial concave flanges. For example, the flange 1164B is at least partially defined by a radius 1168 to form an arc. In other words, the flange 1164B is a radial concave flange. Likewise, the flange 1160B is at least partially defined by a radius 1172 to form an arc. In other words, the flange 1160B is a radial concave flange. As such, the opening 1136B and the opening 1140B are concave-shaped. In the illustrated embodiment, the radius 1168 is larger than the radius 1172.

Figure 33:
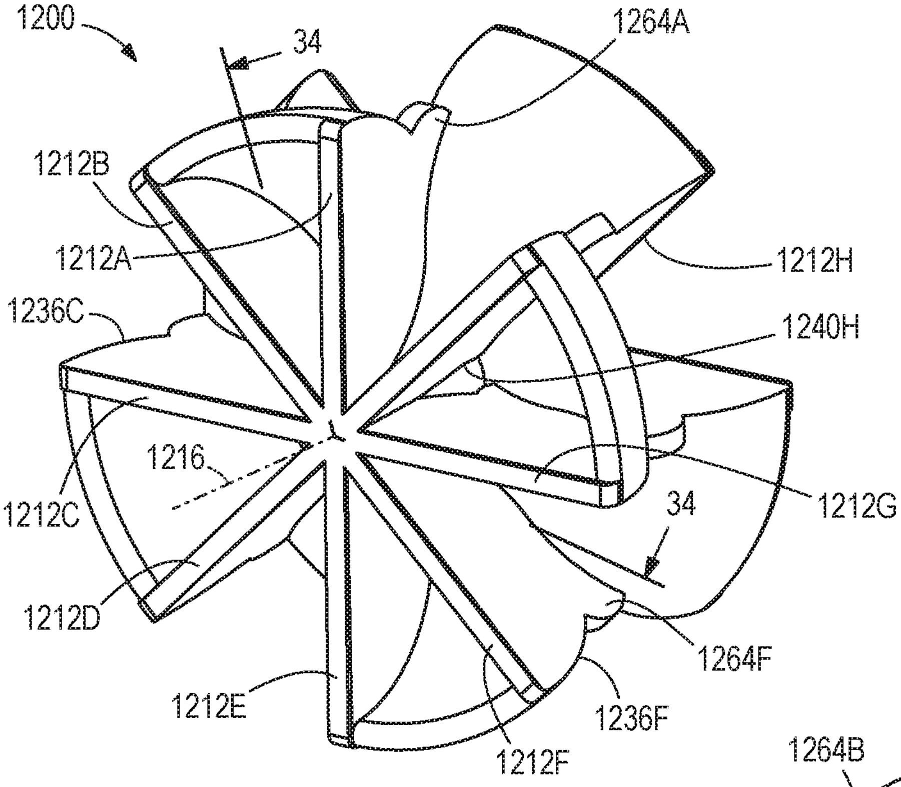
FIG. 33 is a perspective view of a mixer element according to an aspect of the disclosure.
Figure 34:
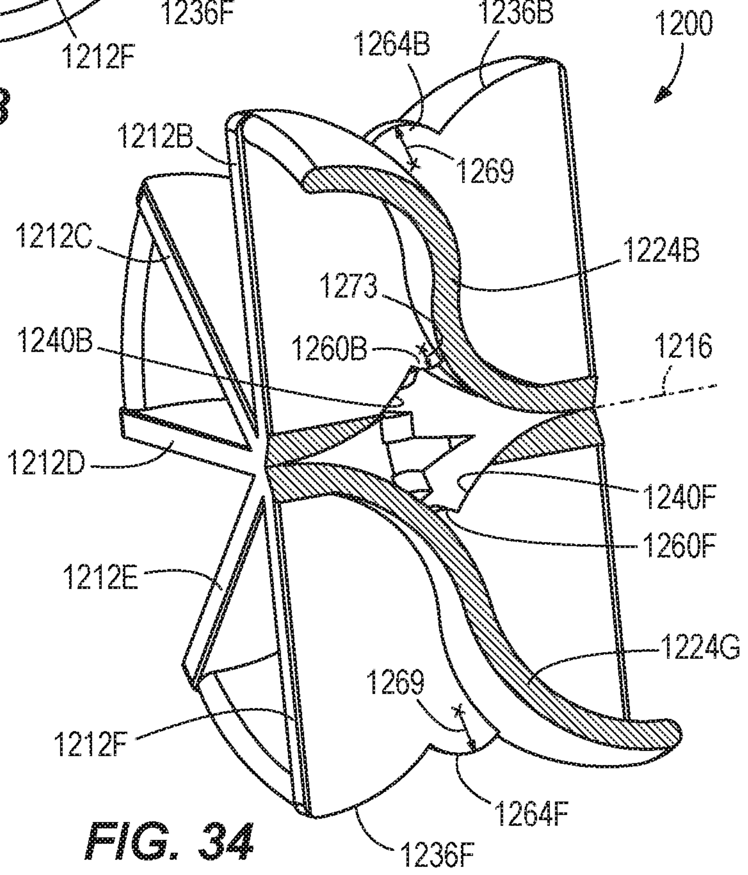
FIG. 34 is a cross-sectional view of the mixer element of FIG. 33, taken along lines 34-34 shown in FIG. 33.

With reference to FIGS. 33 and 34, a mixer element 1200 similar to the mixer element 100 is illustrated with similar reference numerals from the mixer element 100 plus 1100 are used to describe the mixer element 1200. Only differences between the mixer element 1200 and the mixer element 100 are described in detail herein. The mixer element 1200 includes flanges 1260A-1260H and flanges 1264A-1264H similar to the flanges 1060A-1060H and the flanges 1064A-1064H, respectively, of the mixer element 1000. However, the flanges 1260A-1260H are radial convex flanges and the flanges 1264A-1264H are radial convex flanges. For example, the flange 1264B is at least partially defined by a radius 1169 to form an arc. In other words, the flange 1264B is a radial convex flange. Likewise, the flange 1260B is at least partially defined by a radius 1273 to form an arc. In other words, the flange 1260B is a radial convex flange. In the illustrated embodiment, the radius 1269 is larger than the radius 1273.

Figure 35:
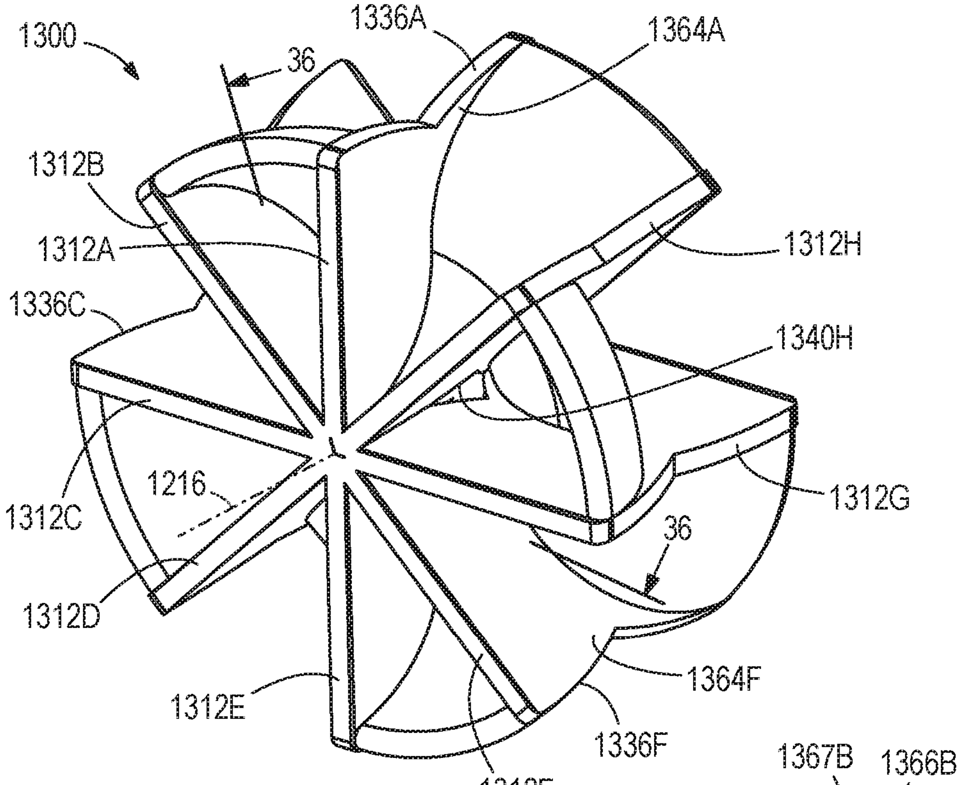
FIG. 35 is a perspective view of a mixer element according to an aspect of the disclosure.
Figure 36:
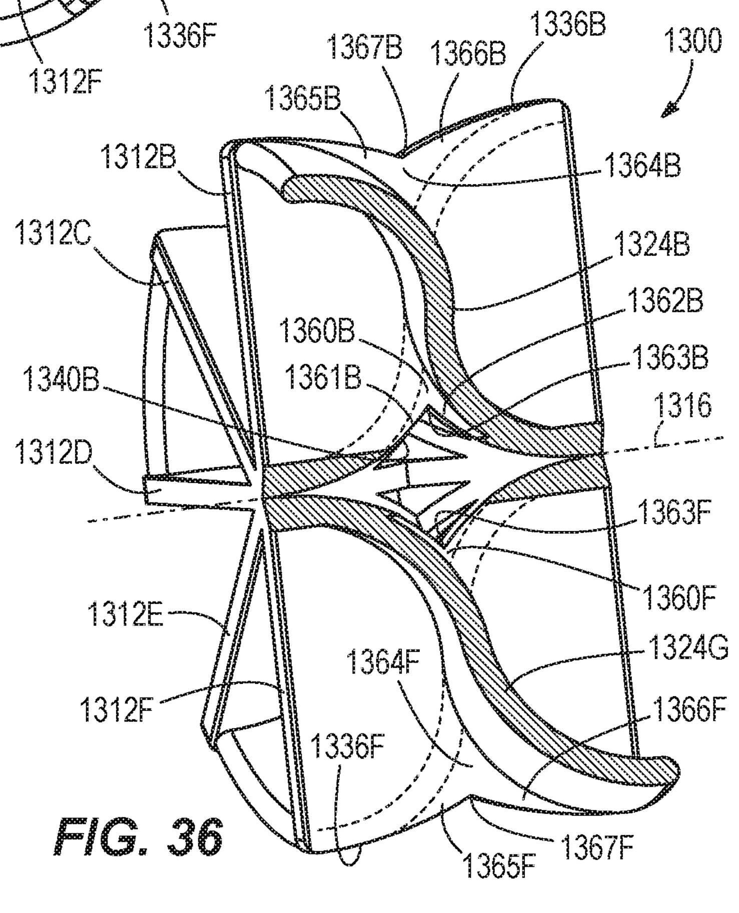
FIG. 36 is a cross-sectional view of the mixer element of FIG. 35, taken along lines 36-36 shown in FIG. 35.

With reference to FIGS. 35 and 36, a mixer element 1300 similar to the mixer element 100 is illustrated with similar reference numerals from the mixer element 100 plus 1200 are used to describe the mixer element 1300. Only differences between the mixer element 1300 and the mixer element 100 are described in detail herein. The mixer element 1300 includes flanges 1360A-1360H and flanges 1364A-1364H similar to the flanges 960A-960H and the flanges 964A-964H, respectively, of the mixer element 900. However, the flanges 1360A-1360H are cusp-shaped concave flanges and the flanges 1364A-1364H are cusp-shaped concave flanges. For example, the flange 1364B includes a first portion 1365B on one side of the opening 1336B and a second portion 1366B on the other side of the opening 1336B. The two portions 1365B, 1366B meet to form an edge 1367B. In other words, the flange 1364B is a cusped concave flange. Likewise, the flange 1360B includes a first portion 1361B on one side of the opening 1340B and a second portion 1362B on the other side of the opening 1340B. The two portions 1361B, 1362B meet to form an edge 1363B. In other words, the flange 1360B is a cusped concave flange.

Figure 37:
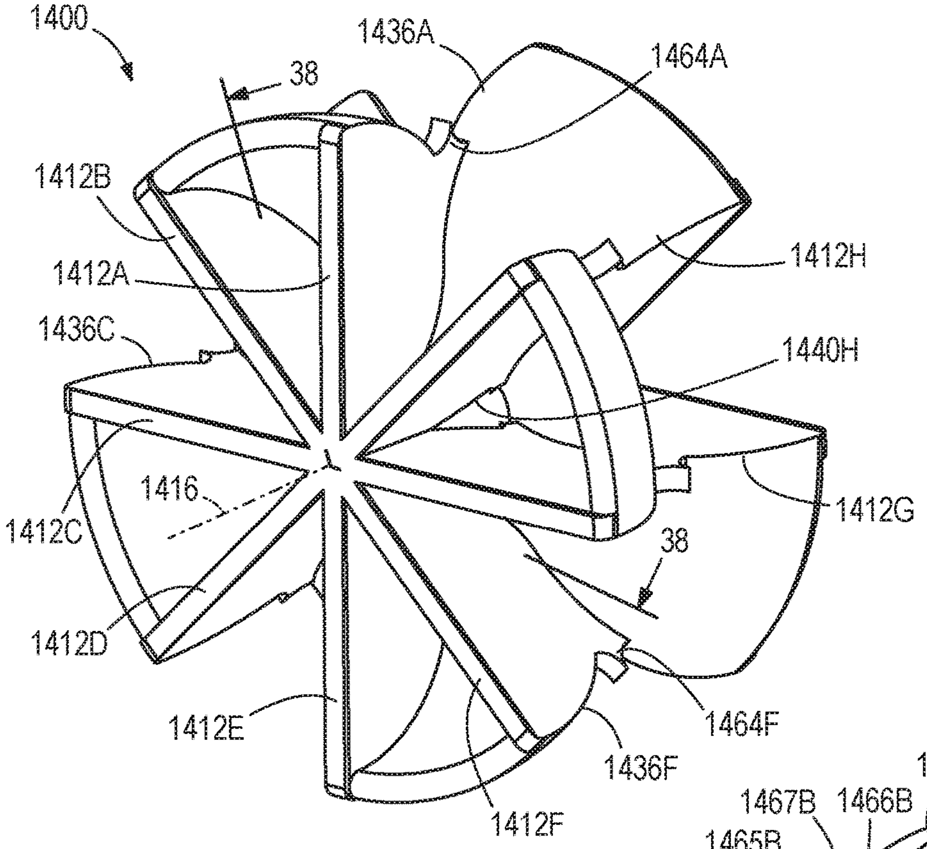
FIG. 37 is a perspective view of a mixer element according to an aspect of the disclosure.
Figure 38:
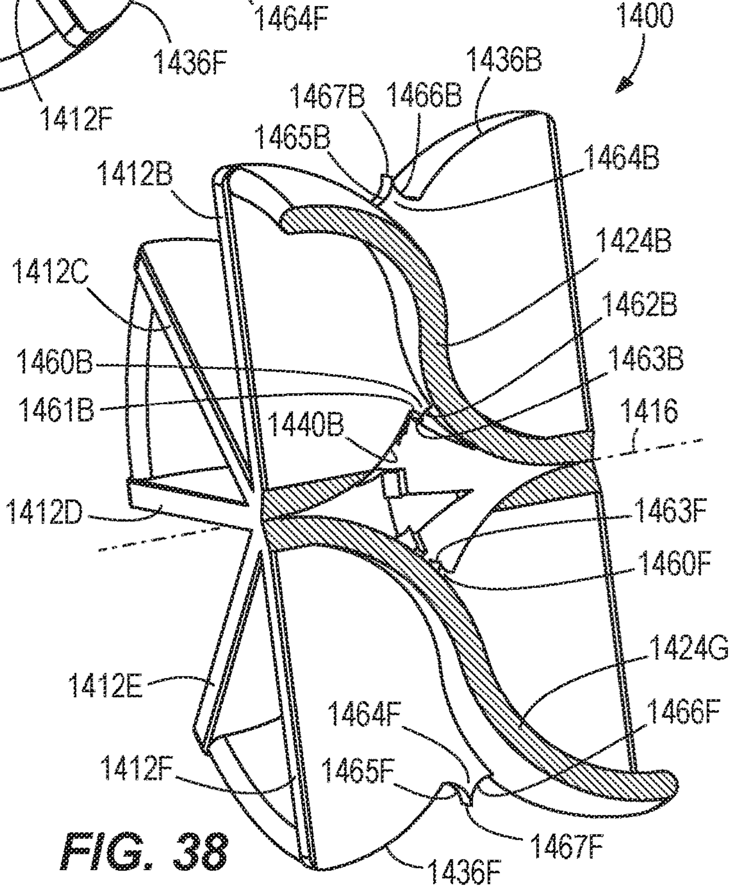
FIG. 38 is a cross-sectional view of the mixer element of FIG. 37, taken along lines 38-38 shown in FIG. 37.

With reference to FIGS. 37 and 38, a mixer element 1400 similar to the mixer element 100 is illustrated with similar reference numerals from the mixer element 100 plus 1300 are used to describe the mixer element 1400. Only differences between the mixer element 1400 and the mixer element 100 are described in detail herein. The mixer element 1400 includes flanges 1460A-1460H and flanges 1464A-1464H similar to the flanges 1060A-1060H and the flanges 1064A-1064H, respectively, of the mixer element 1000. However, the flanges 1460A-1460H are cusp-shaped convex flanges and the flanges 1464A-1464H are cusp-shaped convex flanges. For example, the flange 1464B includes a first portion 1465B on one side of the opening 1436B and a second portion 1466B on the other side of the opening 1436B. The two portions 1465B, 1466B meet to form an edge 1467B. In other words, the flange 1464B is a cusped convex flange. Likewise, the flange 1460B includes a first portion 1461B on one side of the opening 1440B and a second portion 1462B on the other side of the opening 1440B. The two portions 1461B, 1462B meet to form an edge 1463B. In other words, the flange 1460B is a cusped convex flange.

Figure 39:
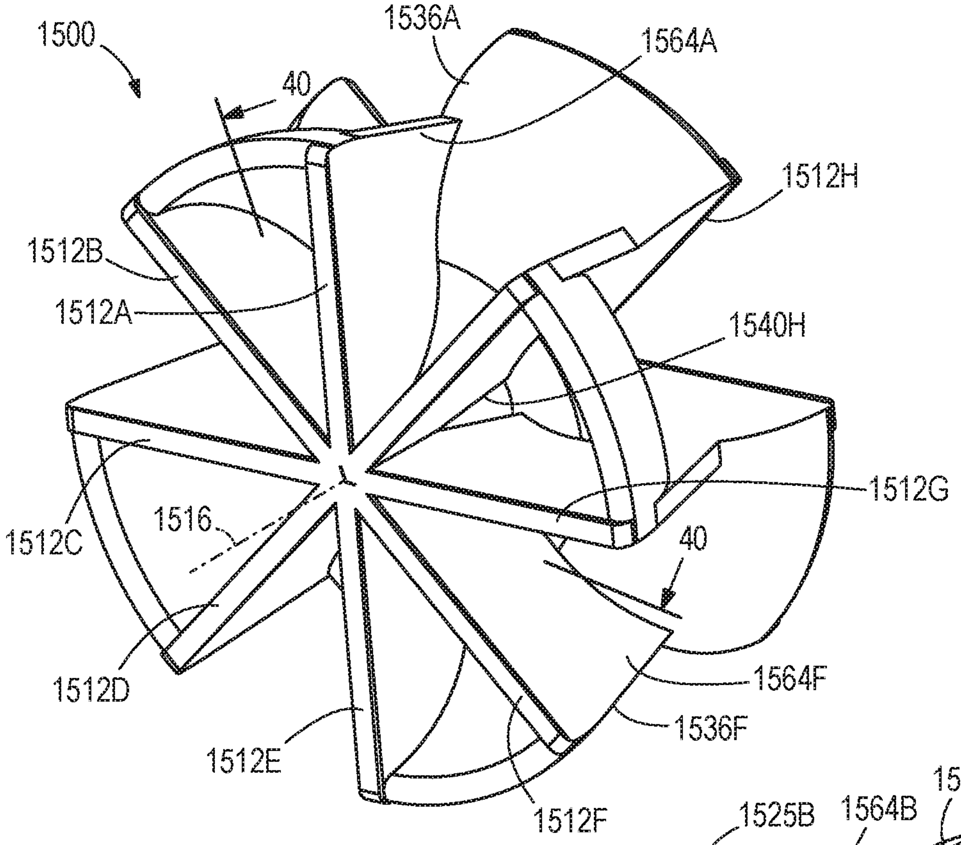
FIG. 39 is a perspective view of a mixer element according to an aspect of the disclosure.
Figure 40:
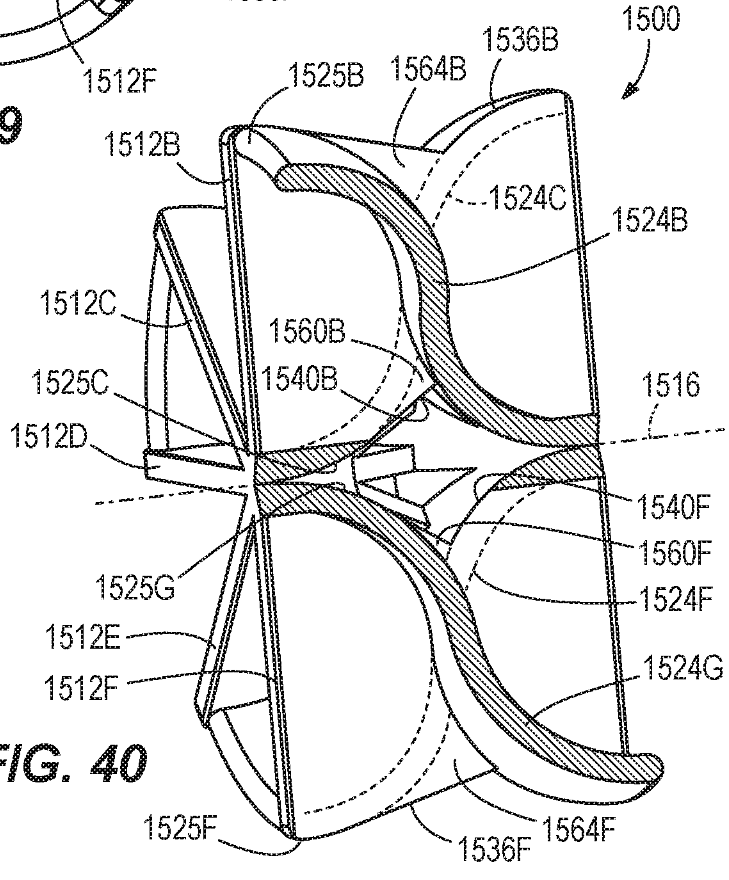
FIG. 40 is a cross-sectional view of the mixer element of FIG. 39, taken along lines 40-40 shown in FIG. 39.

With reference to FIGS. 39 and 40, a mixer element 1500 similar to the mixer element 100 is illustrated with similar reference numerals from the mixer element 100 plus 1400 are used to describe the mixer element 1500. Only differences between the mixer element 1500 and the mixer element 100 are described in detail herein. The mixer element 1500 includes flanges 1560A-1560H and flanges 1564A-1564H similar to the flanges 860A-860H and the flanges 864A-864H, respectively, of the mixer element 800. However, the flanges 1560A-1560H and the flanges 1564A-1564H are linear flanges that are tangent with an upstream end 1525A-1525H of the guide walls 1524A-1524H. For example, the flange 1564B is linear and extends tangentially from the upstream end 1525B of the guide wall 1524B. Likewise, the flange 1560B is linear and extends tangentially from the upstream end 1525C of the guide wall 1524C.

Figure 41:
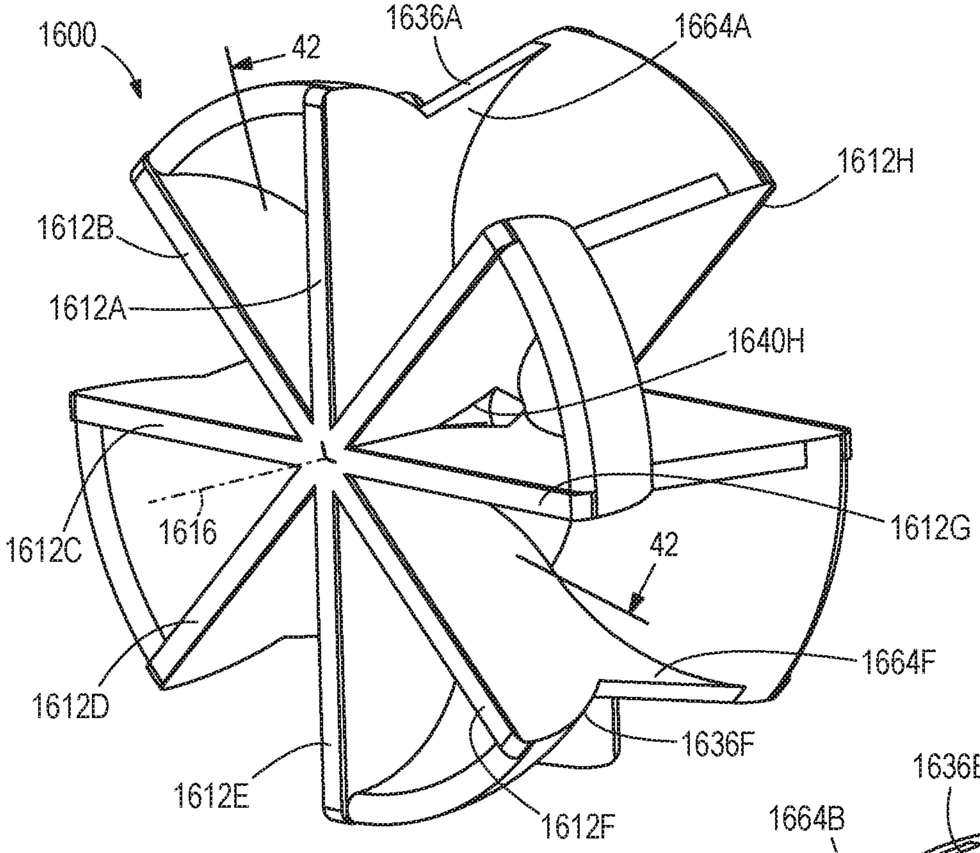
FIG. 41 is a perspective view of a mixer element according to an aspect of the disclosure.
Figure 42:
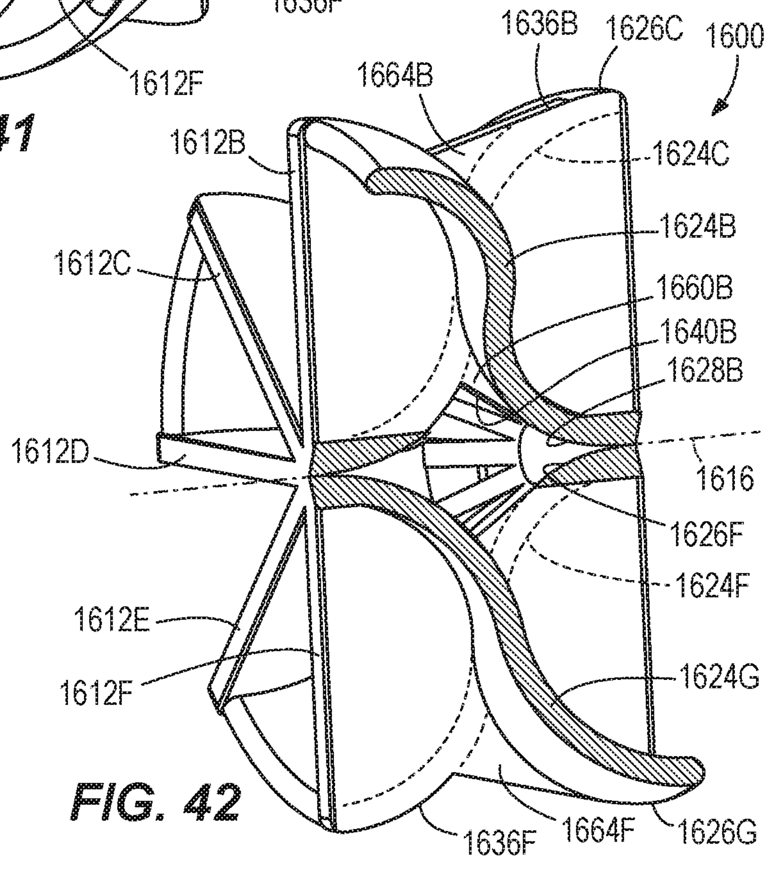
FIG. 42 is a cross-sectional view of the mixer element of FIG. 41, taken along lines 42-42 shown in FIG. 41.

With reference to FIGS. 41 and 42, a mixer element 1600 similar to the mixer element 100 is illustrated with similar reference numerals from the mixer element 100 plus 1500 are used to describe the mixer element 1600. Only differences between the mixer element 1600 and the mixer element 100 are described in detail herein. The mixer element 1600 includes flanges 1660A-1660H and flanges 1664A-1664H similar to the flanges 1560A-1560H and the flanges 1564A-1564H, respectively, of the mixer element 1500. However, the flanges 1660A-1660H and the flanges 1664A-1664H are linear flanges that are tangent with a downstream end 1626A-1626H of the guide walls 1624A-1624H. For example, the flange 1664B is linear and extends tangentially from the downstream end 1626C of the guide wall 1624C. Likewise, the flange 1660B is linear and extends tangentially from the downstream end 1626B of the guide wall 1624B.

Figure 43:
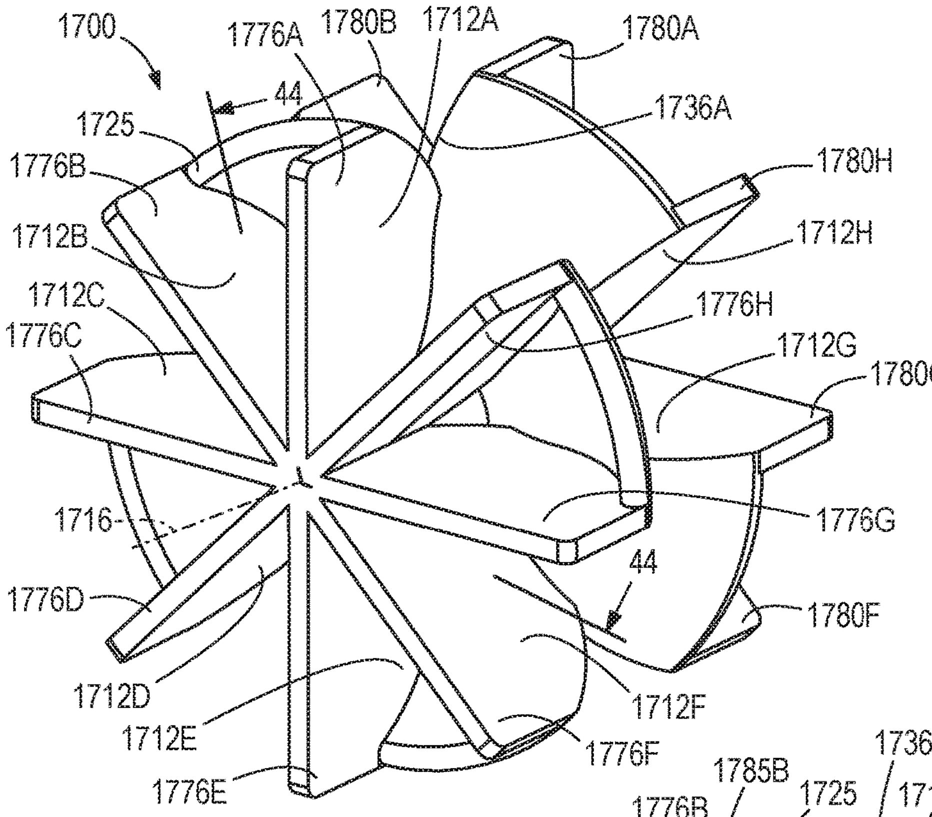
FIG. 43 is a perspective view of a mixer element according to an aspect of the disclosure.
Figure 44:
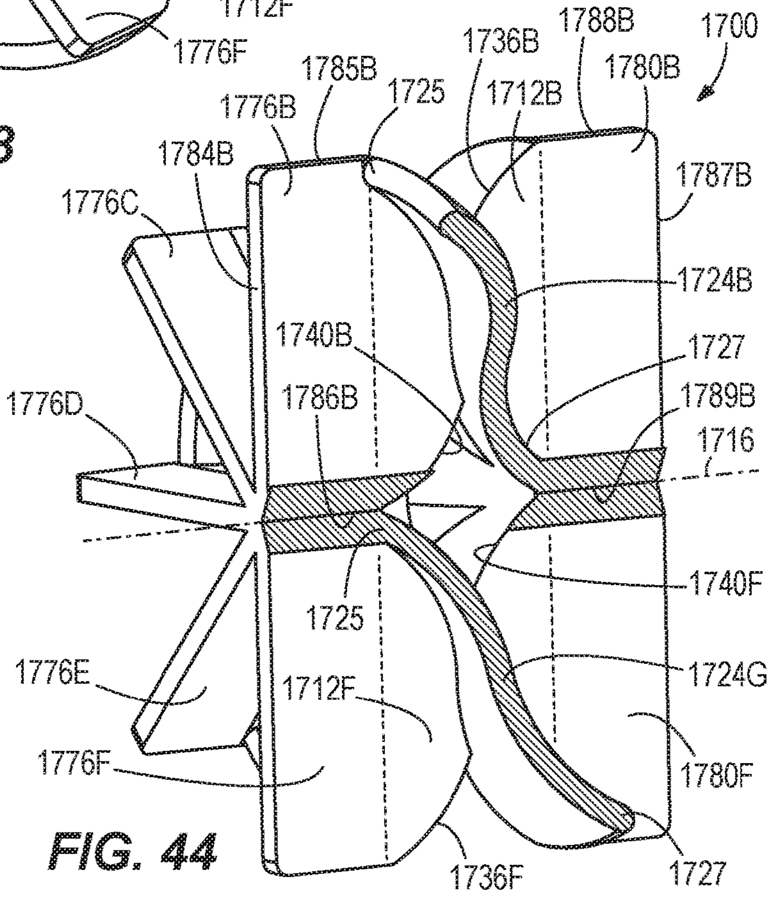
FIG. 44 is a cross-sectional view of the mixer element of FIG. 43, taken along lines 44-44 shown in FIG. 43.

With reference to FIGS. 43 and 44, a mixer element 1700 similar to the mixer element 100 is illustrated with similar reference numerals from the mixer element 100 plus 1600 are used to describe the mixer element 1700. Only differences between the mixer element 1700 and the mixer element 100 are described in detail herein. The mixer element 1700 includes a plurality of fins 1776A-1776H and 1780A-1780H extending from the dividing walls 1712A-1712H. The fins 1776A-1776H (i.e., the upstream fins) extend from an upstream end 1725 of the dividing walls 1712A-1712H and the fins 1780A-1780H (i.e., the downstream fins) extend from a downstream end 1727 of the dividing walls 1712A-1712H. The downstream end 1727 is opposite the upstream end 1725. In the illustrated embodiment, the fin 1776A and the fin 1780A extend co-planar with the dividing wall 1712A. The fins 1776A and the fin 1780A are also co-planar with the radially opposite dividing wall 1712E. For purposes of the description herein, the fins 1776A-1776H extend from the dividing walls 1712A-1712H, which end at the upstream end 1725 of the guide wall 1712A-1712H. In the illustrated embodiment, the mixer element 1700 includes one upstream fin and one downstream fin for each of the dividing walls 1712A-1712H. In some embodiments, upstream fins (i.e., 1776A-1776H) are not included but downstream fins (e.g., 1780A-1780H) are included. In other embodiments, the downstream fins (e.g., 1780A-1780H) are not included but the upstream fins (i.e., 1776A-1776H) are included.

With continued reference to FIGS. 43 and 44, the mixer element 1700 includes a first inlet channel 1704A, a second inlet channel 1704B, and a dividing wall 1712A positioned between the first inlet channel 1704A and the second inlet channel 1704B. The dividing wall 1712A radially extends from a centerline 1716. The fin 1776A and the fin 1780A extend from the dividing wall 1712A along the centerline 1716. The first inlet channel 1704A directs material away from the centerline 1716 and the second inlet channel 1704B directs material toward the centerline 1716. A guide wall 1724A at least partially defines the first inlet channel 1704A, and a guide wall 1724B at least partially defines the second inlet channel 1704B. An opening 1736A and an opening 1740A are formed in the dividing wall 1712A. Likewise, an opening 1736B and an opening 1740B are formed in the dividing wall 1712B.

With continued reference to FIGS. 43 and 44, each of the fins 1776A-1776H and 1780A-1780H includes a first edge, a second edge, and a third edge. The second edge and the third edge of each fin are coupled to the corresponding dividing wall. For example, fin 1776B includes a first edge 1784B, a second edge 1785B, and a third edge 1786B. The second edge 1785B and the third edge 1786B are coupled to the dividing wall 1712B. In the illustrated embodiment, the first edge 1784B extends between the second edge 1785B and the third edge 1786B and is an upstream edge of the fin 1776B. In the illustrated embodiment, the first edge 1784B and the second edge 1785B are linear. As another example, the fin 1780B includes a first edge 1787B, a second edge 1788B, and a third edge 1789B. The second edge 1788B and the third edge 1789B are coupled to the dividing wall 1712B. In the illustrated embodiment, the first edge 1787B is a downstream edge of the fin 1780B. The fins 1776A-1776H and 1780A-1780H improves the overall mixing performance of the mixer element 1700. For example, the fins 1776A-1776H and 1780A-1780H reduce the amount of streaking that occurs in an output of the mixer element 1700. The fins 1776A-1776H and 1780A-1780H also reduce the pressure loss across the mixer element 58.

Figure 45:
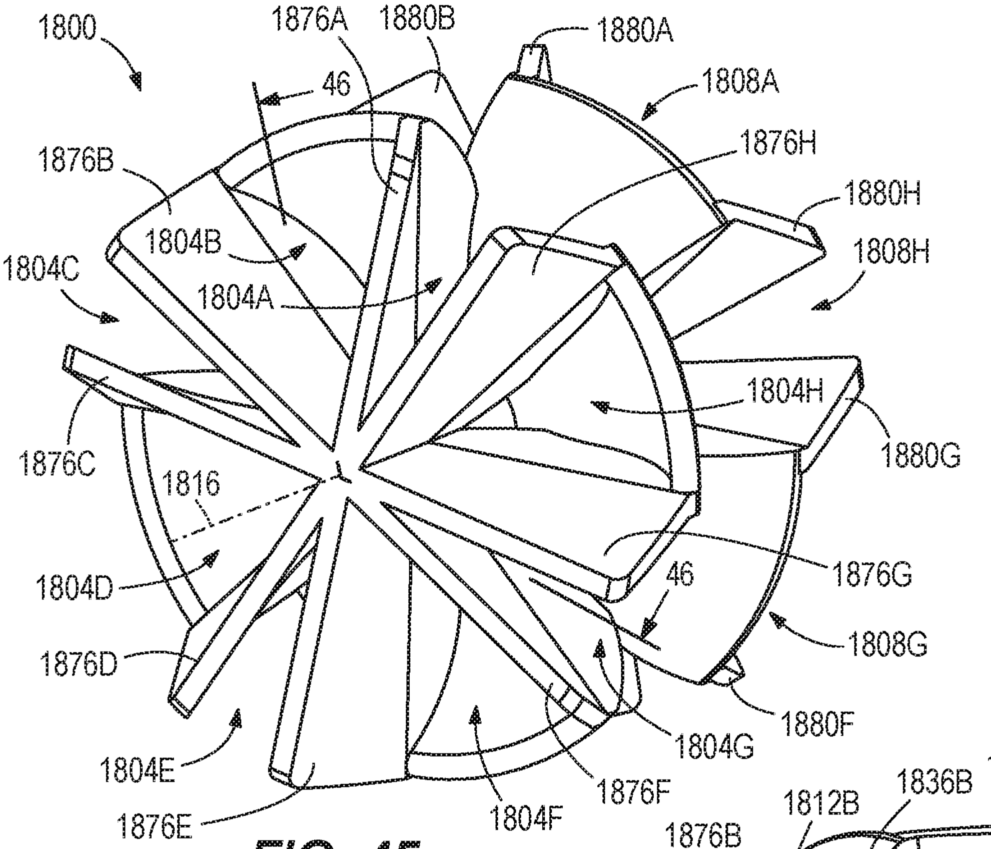
FIG. 45 is a perspective view of a mixer element according to an aspect of the disclosure.
Figure 46:
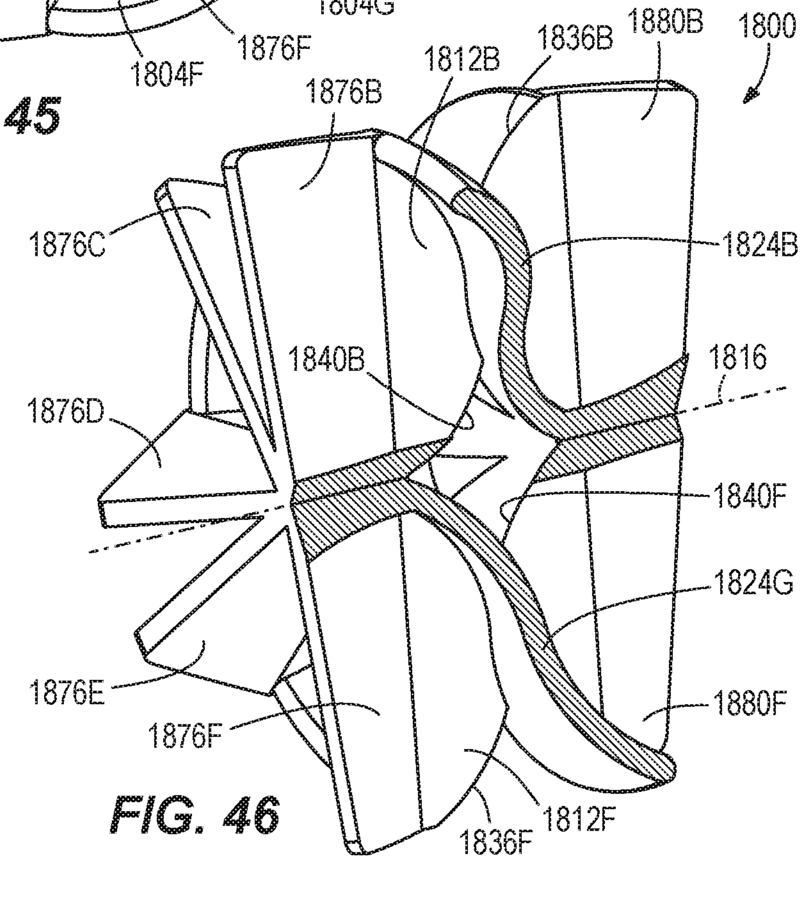
FIG. 46 is a cross-sectional view of the mixer element of FIG. 45, taken along lines 46-46 shown in FIG. 45.

With reference to FIGS. 45 and 46, a mixer element 1800 similar to the mixer element 100 is illustrated with similar reference numerals from the mixer element 100 plus 1700 are used to describe the mixer element 1800. Only differences between the mixer element 1800 and the mixer element 100 are described in detail herein. The mixer element 1800 includes a plurality of upstream fins 1876A-1876H and a plurality of downstream fins 1880A-1880H extending from the dividing walls 1812A-1812H. In the illustrated embodiment, the fin 1876A and the fin 1876H partially block a flow of material to the first inlet channel 1804A. In other words, the fin 1876A redirects material that would have otherwise gone into the inlet channel 1804A to the inlet channel 1804B. Likewise, the fin 1876B and the fin 1876C partially block a flow of material to the third inlet channel 1804C. In this sense, the fins 1876A-1876H are angled toward an adjacent in-to-out inlet channel (e.g., inlet channels 1804A, 1804C, 1804E, 1804G) and are angled away from an adjacent out-to-in inlet channel (e.g., inlet channels 1804B, 1804D, 1804F, 1804H). Likewise, the downstream fins 1880A-1880H are angled to partially block a flow a material leaving in-to-out outlet channels (e.g., outlet channels 1808B, 1808D, 1808F, 1808H). For example, the fin 1880H and the fin 1880G are angled towards and at least partially block material leaving the outlet channel 1808H.

Figure 47:
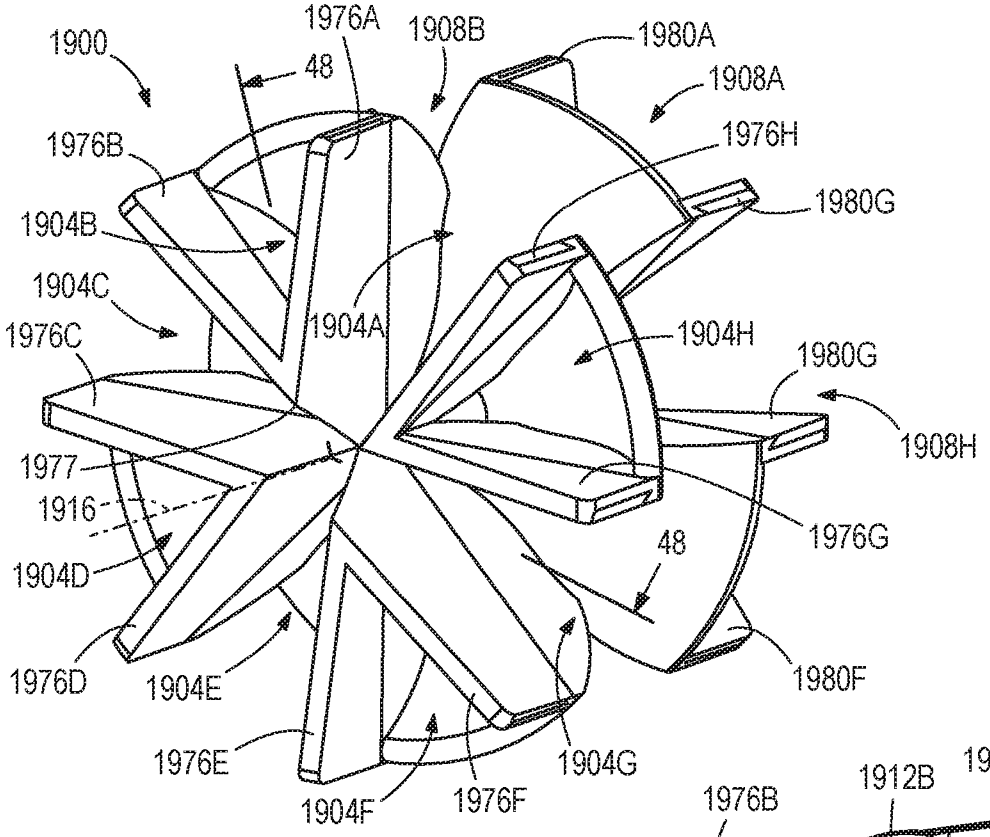
FIG. 47 is a perspective view of a mixer element according to an aspect of the disclosure.
Figure 48:
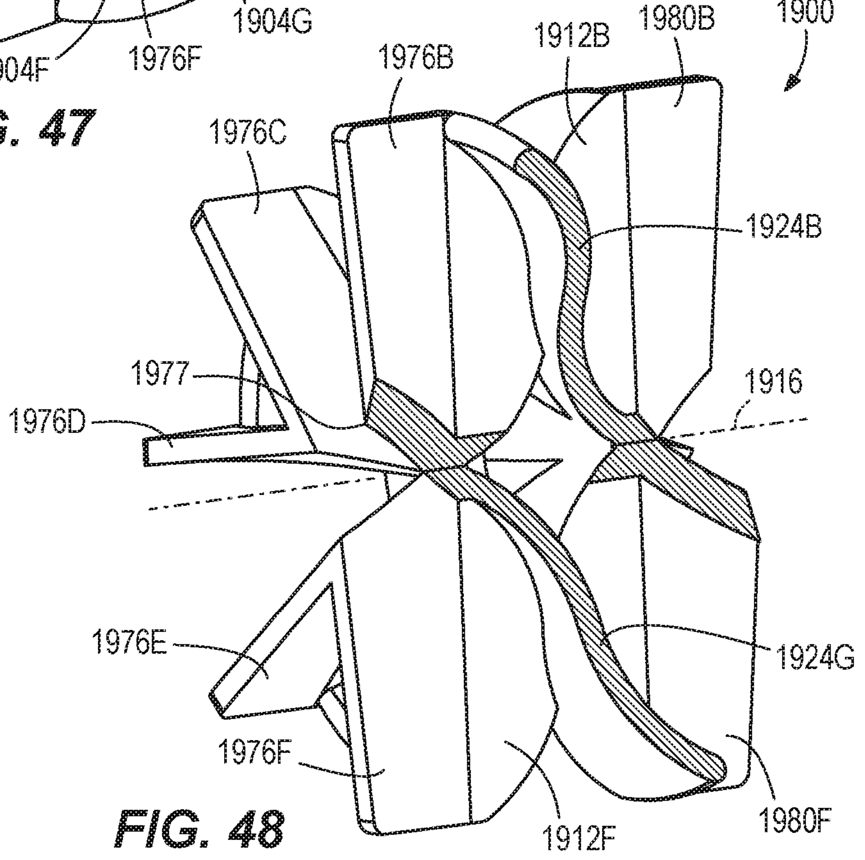
FIG. 48 is a cross-sectional view of the mixer element of FIG. 47, taken along lines 48-48 shown in FIG. 47.

With reference to FIGS. 47 and 48, a mixer element 1900 similar to the mixer element 100 is illustrated with similar reference numerals from the mixer element 100 plus 1800 are used to describe the mixer element 1900. Only differences between the mixer element 1900 and the mixer element 100 are described in detail herein. The mixer element 1900 includes a plurality of upstream fins 1976A-1976H and a plurality of downstream fins 1980A-1980H extending from the dividing walls 1912A-1912H. In the illustrated embodiment, the fin 1976A and the fin 1976B partially block a flow of material to the second inlet channel 1904B. Likewise, the fin 1976C and the fin 1876D partially block a flow of material to the fourth inlet channel 1904D. In this sense, the fins 1976A-1976H are angled toward an adjacent out-to-in inlet channel (e.g., inlet channels 1904B, 1904D, 1904F, 1904H) and are angled away from an adjacent in-to-out inlet channel (e.g., inlet channels 1904A, 1904C, 1904E, 1904G). Likewise, the downstream fins 1980A-1980H are angled to partially block a flow a material leaving out-to-in outlet channels (e.g., outlet channels 1908A, 1908C, 1908E, 1908G). For example, the fin 1980A and the fin 1980H are angled towards and at least partially block material leaving the outlet channel 1908A. In the illustrated embodiment, the fin 1976A and the fin 1976B intersect at a point 1977 that is positioned off the centerline 1916.

With reference to FIGS. 49-57, a mixer element 2000, a mixer element 2100, and a mixer element 2200 are shown to illustrate an optimization of fin shape and geometry.

Figure 49:
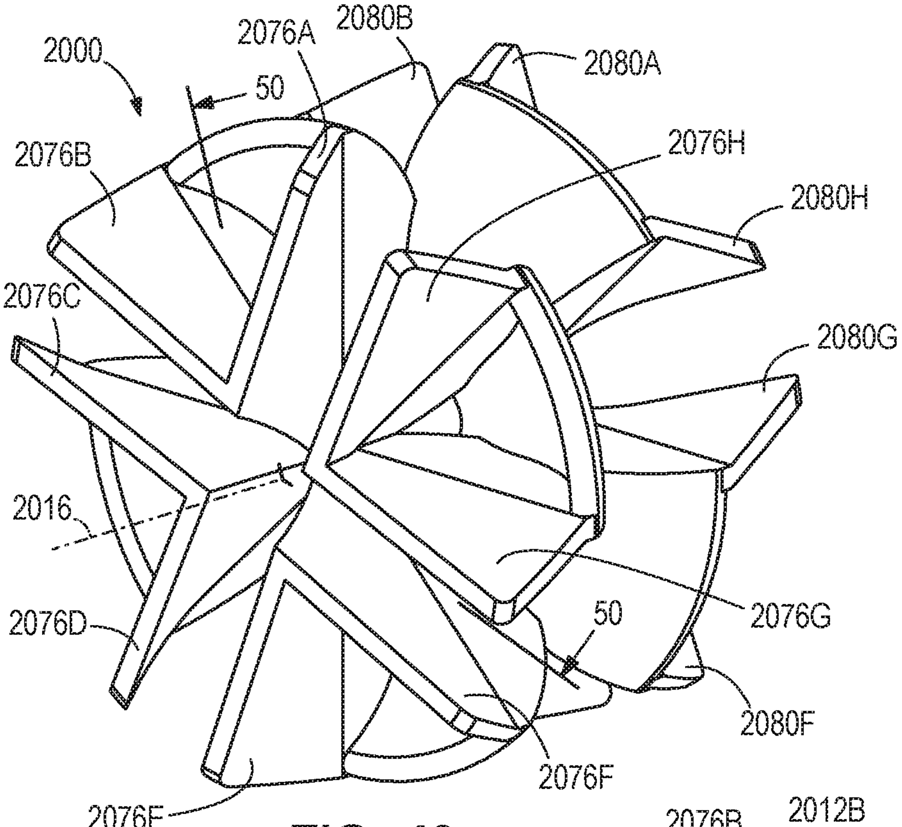
FIG. 49 is a perspective view of a mixer element according to an aspect of the disclosure.
Figure 50:
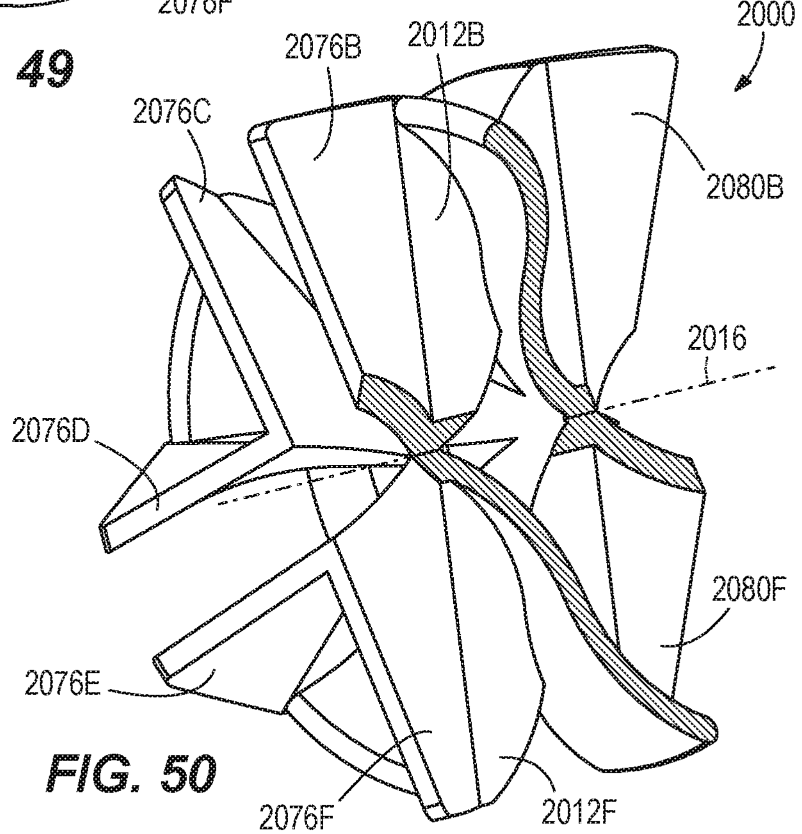
FIG. 50 is a cross-sectional view of the mixer element of FIG. 49, taken along lines 50-50 shown in FIG. 49.
Figure 51:
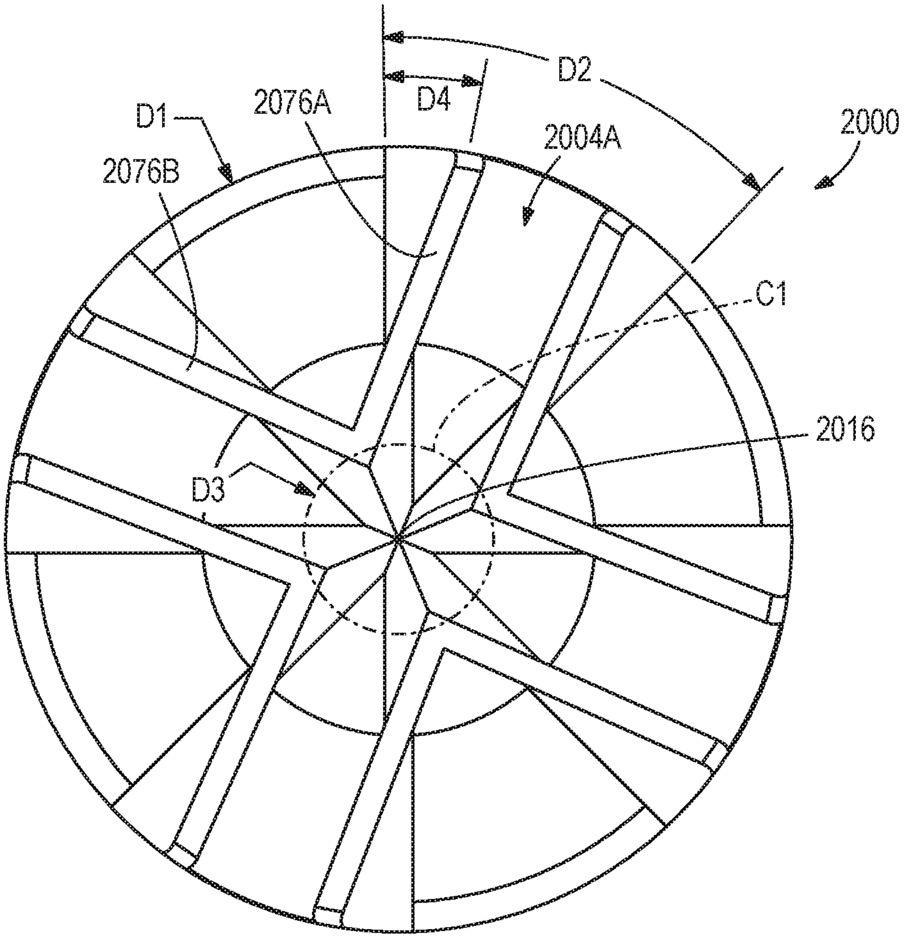
FIG. 51 is a front view of the mixer element of FIG. 49.

With reference to FIGS. 49-51, the mixer element 2000 includes a first dimension D1 that is measured as the diameter of the mixer element 2000, and a second dimension D2 that is measured as an angular span of the inlet channel 2004A. A third dimension D3 is measured as the diameter of a circle Cl centered in the centerline 2016 and passing through an intersection of the first fin 2076A and the second fin 2076B. Finally, a fourth dimension D4 is measured as an angular span of the first fin 2076A. The third dimension D3 is equal to the first dimension D1 times a first scalar and the fourth dimension D4 is equal to the second dimension D2 times a second scalar. In other words, D3 is equal to D1 multiplied by the first scalar and D4 is equal to D2 multiplied by the second scalar. In the illustrated embodiment, the first dimension D1 is approximately 10 millimeters, the second dimension is approximately 45 degrees, the third dimension D3 is approximately 2.5 millimeters, and the fourth dimension D4 is approximately 11.25 degrees. As such, the first scalar is approximately 0.25 and the second scalar is approximately 0.25.

Figure 52:
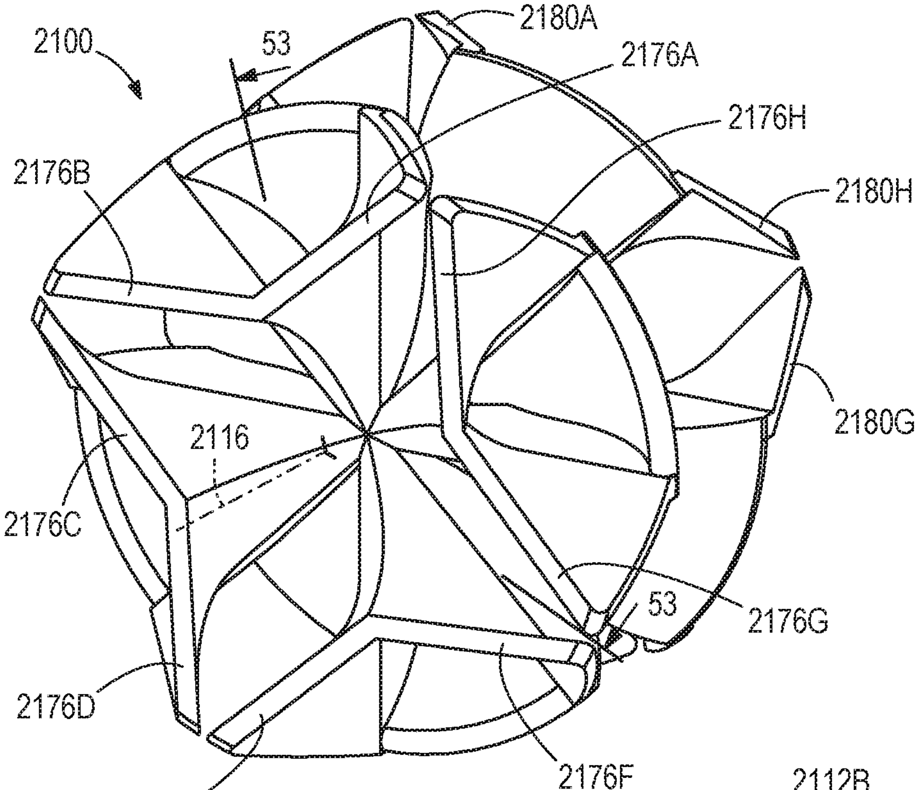
FIG. 52 is a perspective view of a mixer element according to an aspect of the disclosure.
Figure 53:
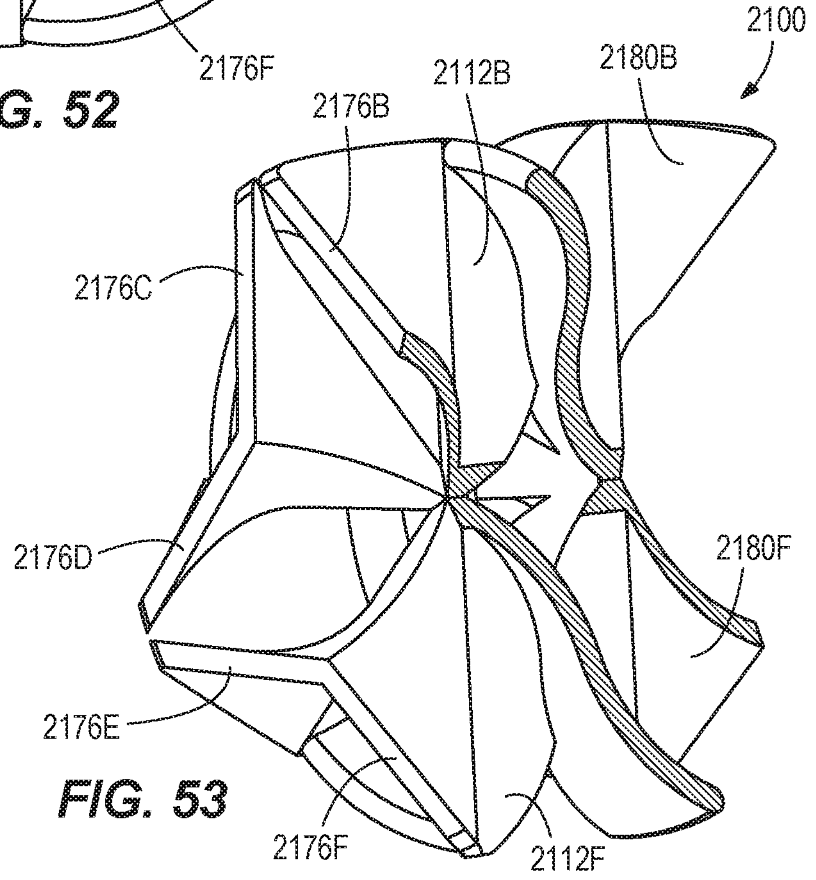
FIG. 53 is a cross-sectional view of the mixer element of FIG. 52, taken along lines 53-53 shown in FIG. 52.
Figure 54:
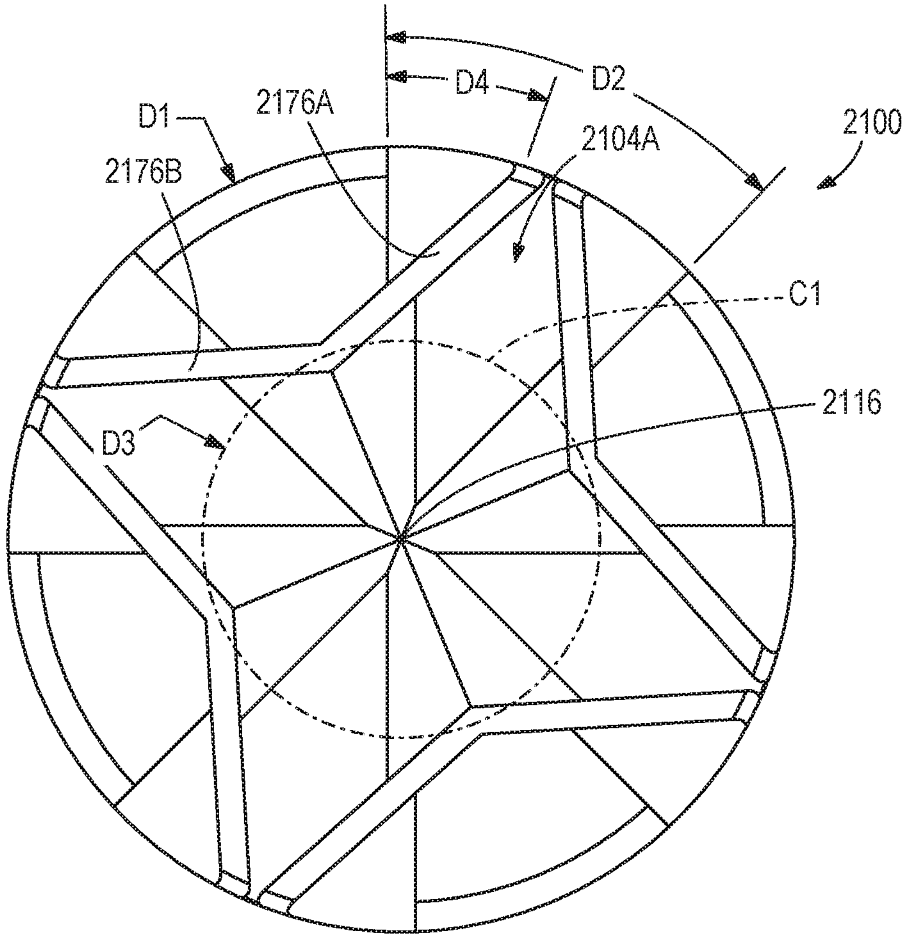
FIG. 54 is a front view of the mixer element of FIG. 52.

With reference to FIGS. 52-54 and the mixer element 2100, the first dimension D1 is approximately 10 millimeters, the second dimension D2 is approximately 45 degrees, the third dimension D3 is approximately 5 millimeters, and the fourth dimension D4 is approximately 16.875 degrees. As such, for the mixer element 2100 the first scalar is approximately 0.5 and the second scalar is approximately 0.375.

Figure 55:
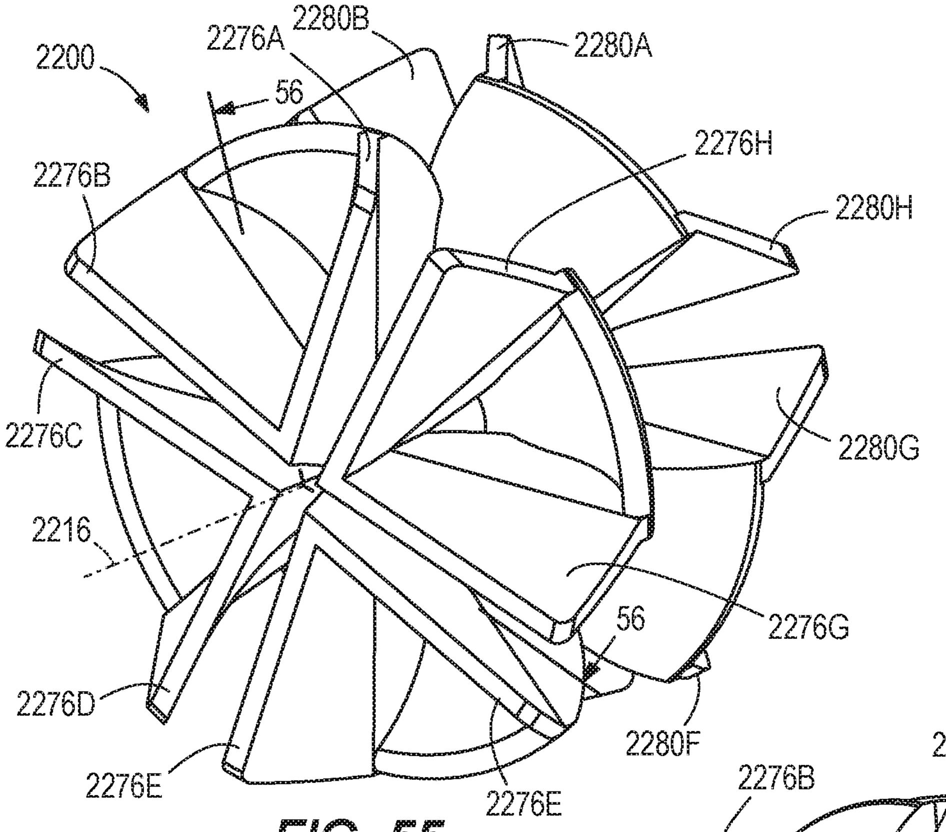
FIG. 55 is a perspective view of a mixer element according to an aspect of the disclosure.
Figure 56:
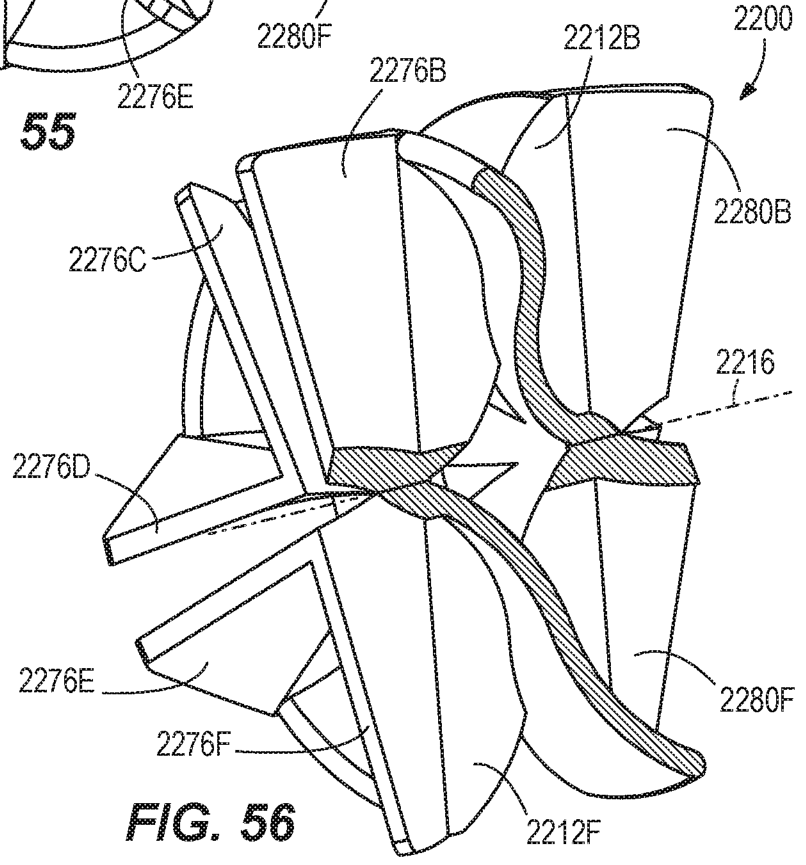
FIG. 56 is a cross-sectional view of the mixer element of FIG. 55, taken along lines 56-56 shown in FIG. 55.
Figure 57:
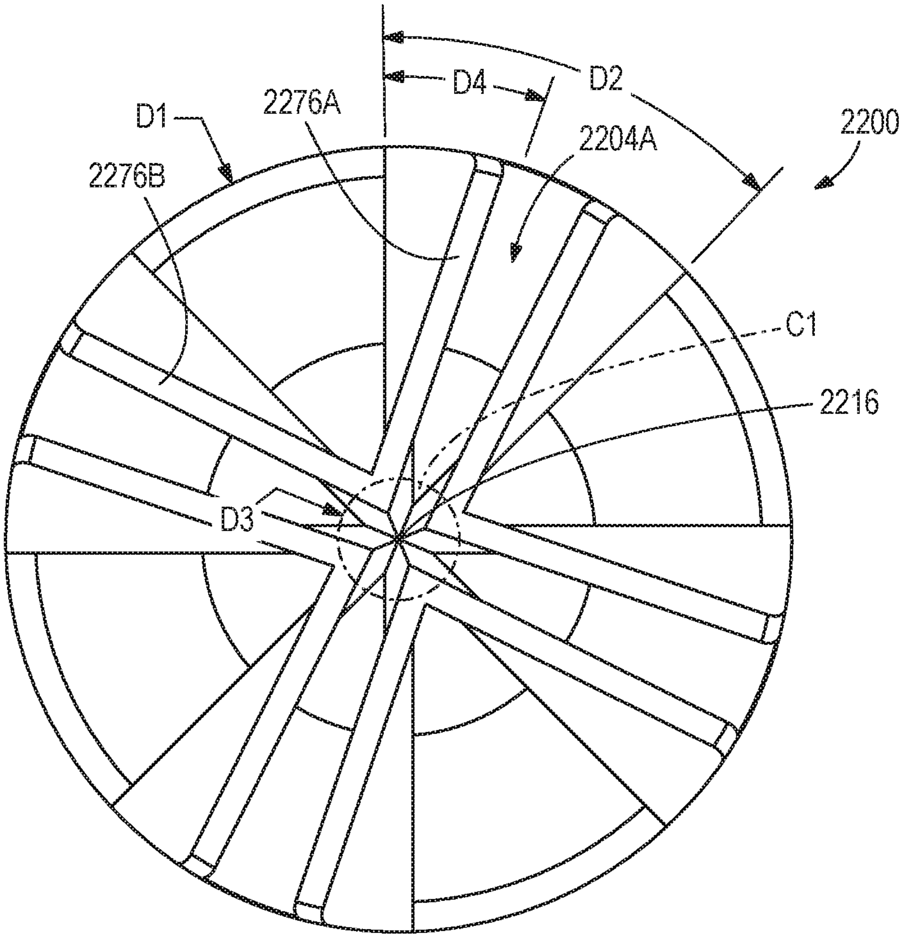
FIG. 57 is a front view of the mixer element of FIG. 55.
Figure 58:
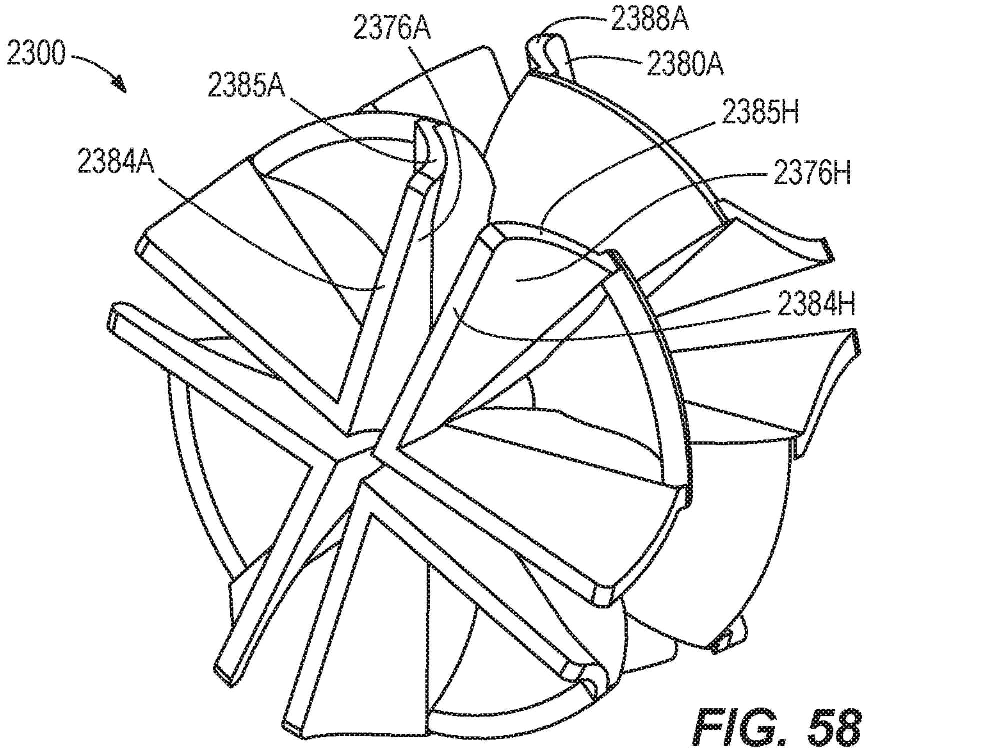
FIG. 58 is a perspective view of a mixer element according to an aspect of the disclosure.

With reference to FIGS. 55-57 and the mixer element 2200, the first dimension D1 is approximately 10 millimeters, the second dimension D2 is approximately 45 degrees, the third dimension D3 is approximately 1.25 millimeters, and the fourth dimension D4 is approximately 11.25 degrees. As such, for the mixer element 2200 the first scalar is approximately 0.125 and the second scalar is approximately 0.25.

In some embodiments, the first scalar is within a range of approximately 0.125 and approximately 0.5. In other embodiments, the second scalar is within a range of approximately 0.125 to and approximately 0.5.

With reference to FIGS. 58-62, a mixer element 2300, a mixer element 2400, a mixer element 2500, and a mixer element 2600 are shown to variations on the fin shape and geometry. For example, the mixer element 2300 includes upstream fins 2376A-2376H and downstream fins 2380A-2380H with non-linear loft. In other words, the second edge (i.e., the radially outward edge) of each fin is non-linear. For example, the second edge 2385A of the fin 2376A is non-linear and the first edge 2384A of the fin 2376A is linear. Likewise, the second edge 2385H of the fin 2376H is non-linear and the first edge 2384H of the fin 2376H is linear. In the illustrated embodiment, the fin 2376A is a lofted fin with the edge 2385A projected normally from the profile edge 2384A. Similarly, the second edge 2388A of the downstream fin 2380A is non-linear.

Figure 59:
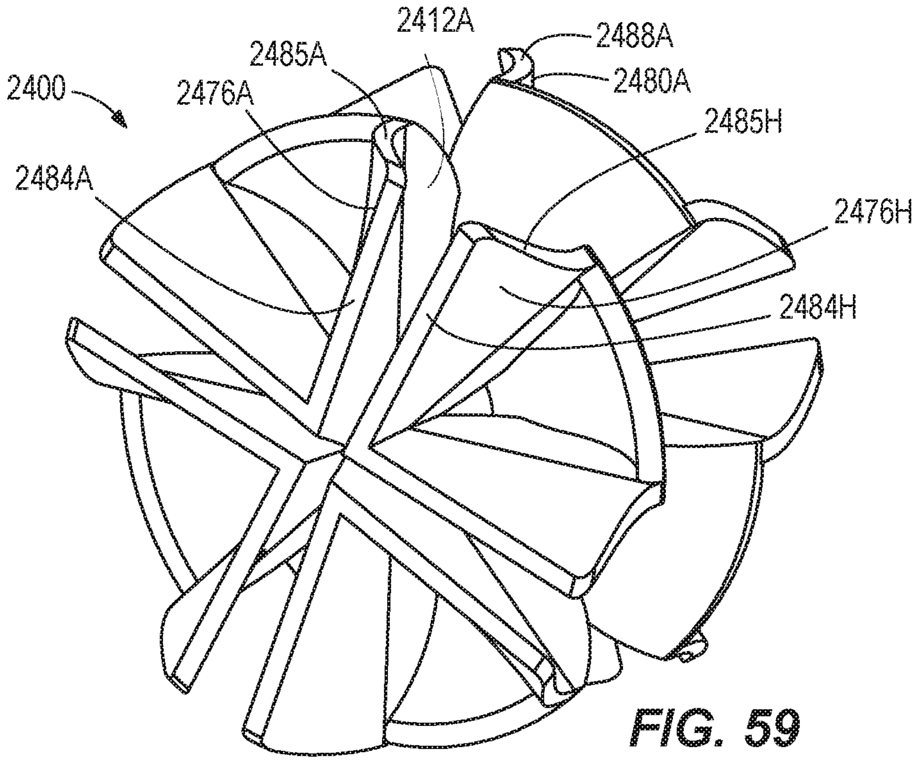
FIG. 59 is a perspective view of a mixer element according to an aspect of the disclosure.

With reference to FIG. 59, the mixer element 2400 includes upstream fins 2476A-2476H and downstream fins 2480A-2480H with non-linear loft. In other words, the second edge (i.e., the radially outward edge) of each fin is non-linear. For example, the second edge 2485A of the fin 2476A is non-linear and the first edge 2484A of the fin 2476A is linear. The non-linear edges (e.g., edge 2485A) of the mixer element 2400 is different from the non-linear edges (e.g., 2385A) of the mixer element 2300 in that the edge 2485A is projected normally from the upstream-most edge of the dividing wall 2412A. In other words, the lofted fin 2476A is projected normally from where the fin 2476A and the dividing wall 2412A intersect.

Figure 60:
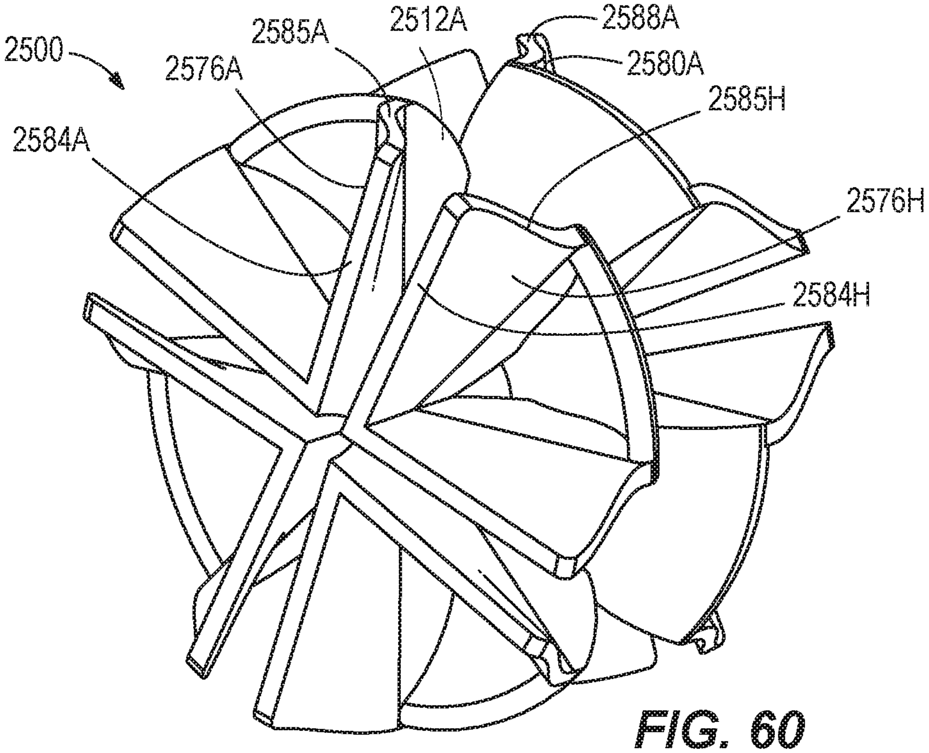
FIG. 60 is a perspective view of a mixer element according to an aspect of the disclosure.

With reference to FIG. 60, the mixer element 2500 includes upstream fins 2576A-2576H and downstream fins 2580A-2580H with non-linear loft. In other words, the second edge (i.e., the radially outward edge) of each fin is non-linear. For example, the second edge 2585A of the fin 2576A is non-linear and the first edge 2584A of the fin 2576A is linear. The non-linear edges (e.g., edge 2585A) of the mixer element 2500 is different from the non-linear edges (e.g., 2385A) of the mixer element 2300 in that the edge 2585A is projected normally from both the upstream-most edge of the dividing wall 2512A and projected normally from the profile edge 2584A. In some embodiments, the non-linear edge 2585A is sigmoid shaped.

Figure 61:
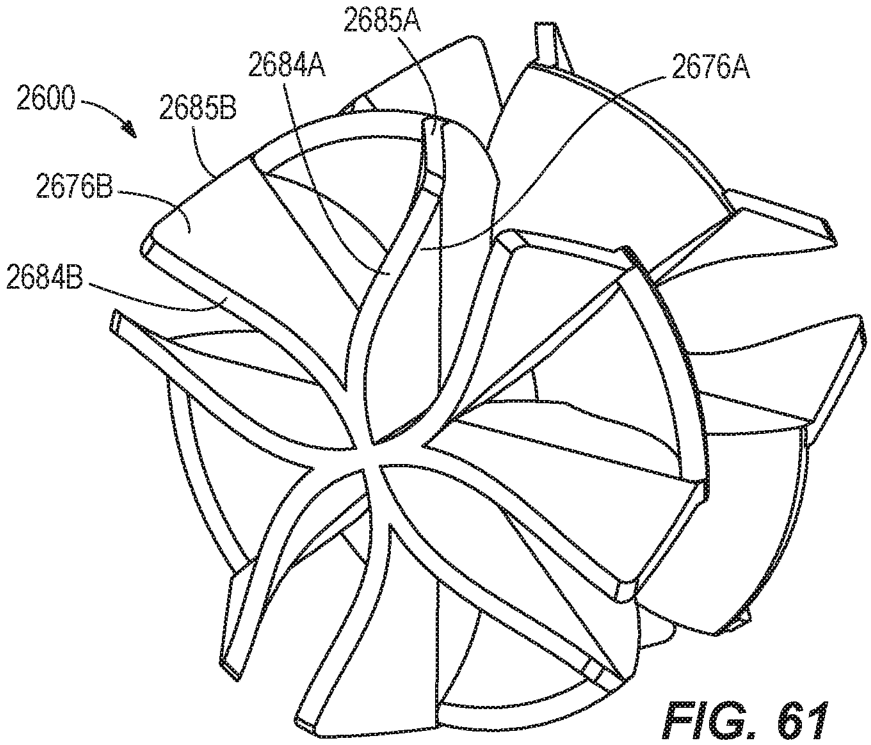
FIG. 61 is a perspective view of a mixer element according to an aspect of the disclosure.

With reference to FIG. 61, the mixer element 2600 includes upstream fins 2676A-2676H and downstream fins 2680A-2680H with non-linear profile. In other words, the first edge (i.e., the upstream or downstream edge) of each fin is non-linear. For example, the first edge 2684A of the fin 2676A is non-linear and the second edge 2685A of the fin 2676A is linear. Likewise, the first edge 2684B of the fin 2676B is non-linear and the second edge 2685B is linear. In some embodiments, the first edge 2684A is sigmoid shaped.

Figure 62:
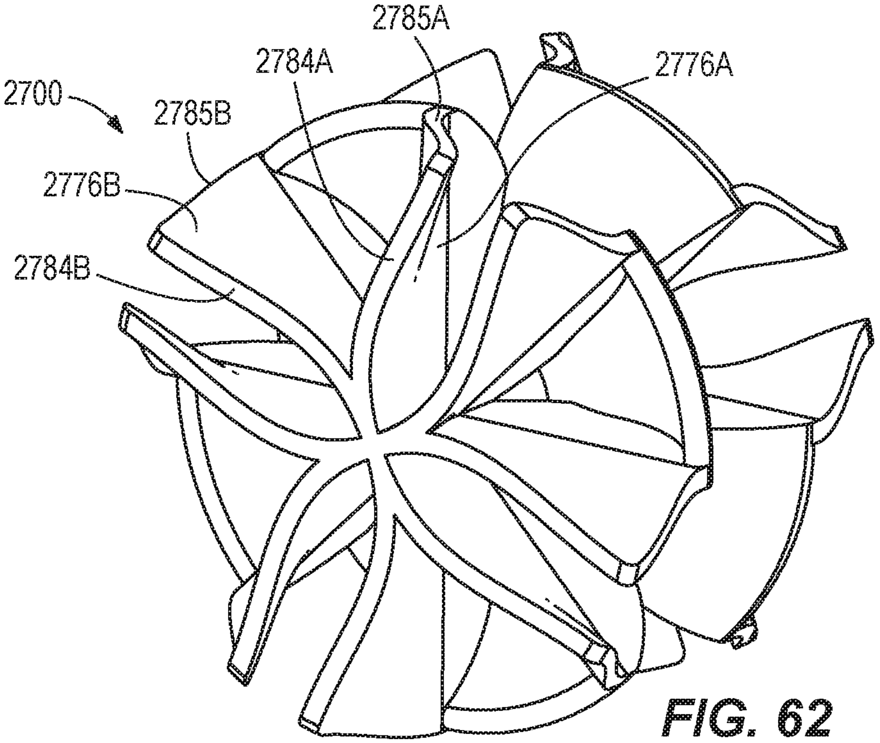
FIG. 62 is a perspective view of a mixer element according to an aspect of the disclosure.

With reference to FIG. 62, the mixer element 2700 includes upstream fins 2776A-2776H and downstream fins 2780A-2780H with non-linear profiles and non-linear lofts. In other words, the first edge (i.e., the upstream or downstream edge) and the second edge (i.e., the radially outward edge) of each fin is non-linear. For example, the first edge 2784A of the fin 2776A is non-linear and the second edge 2785A of the fin 2776A is non-linear. Likewise, the first edge 2784B of the fin 2776B is non-linear and the second edge 2785B is non-linear. In some embodiments, the first edge 2784A and the second edge 2785A are sigmoid shaped.

Figure 63:
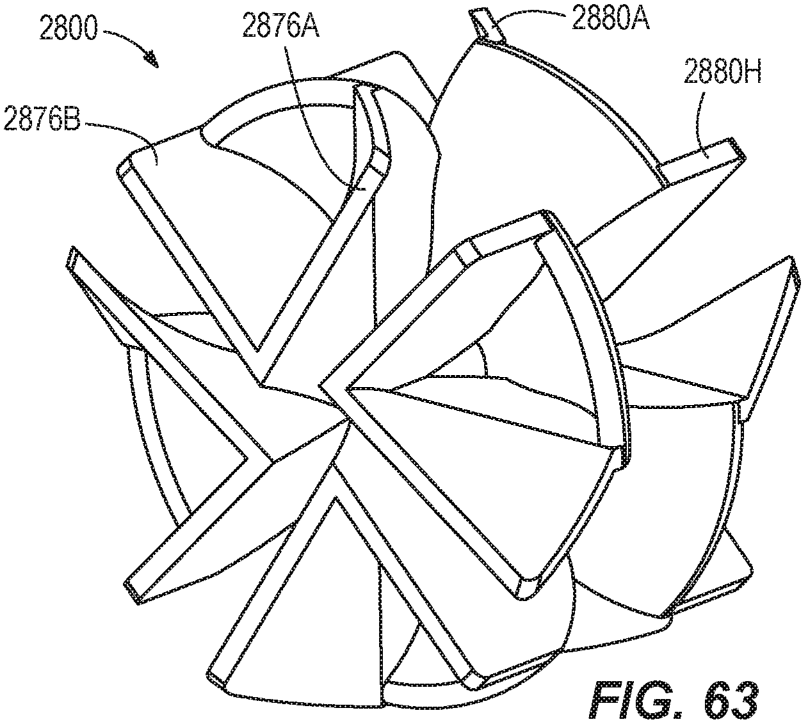
FIG. 63 is a perspective view of a mixer element according to an aspect of the disclosure.

With reference to FIG. 63, a mixer element 2800 includes asymmetrical upstream fins 2876A-2876H and asymmetrical downstream fins 2880A-2880H. For example, fin 2876A is not symmetrical to the fin 2876B. Likewise, the fin 2880A is not symmetrical to the fin 2880H. In other words, a fin can extend from a dividing wall in different directions and be shaped differently from an adjacent fin.

In some embodiments, the mixer element may include fins with more than one planar surface to a side. For example, a fin may be partially defined by two planar surface on one side of the fin and partially defined by two planar surfaces on the opposite side of the fin.

Although the disclosure has been described in detail with reference to certain embodiments above, variations and modifications exist within the scope and spirit of one or more independent aspects of the disclosure as described.

What is claimed is:

1. A mixer comprising:
- a first inlet channel;
- a second inlet channel;
- a first dividing wall positioned between the first inlet channel and the second inlet channel, the first dividing wall radially extending from a centerline;
- wherein the first inlet channel directs material away from the centerline and the second inlet channel directs material toward the centerline;
- wherein the first inlet channel is at least partially defined by a first guide wall and the second inlet channel is at least partially defined by a second guide wall; and
- wherein a first distance is a radius measured from the centerline to an outer extent of the mixer, and a second distance is measured from the centerline to a point where the first guide wall and the second guide wall overlap at the dividing wall; and wherein a ratio of the second distance to the first distance is within a range of 0.5 to 0.7.

2. The mixer of claim 1, further including a first outlet channel aligned with the first inlet channel along the centerline and a second outlet channel aligned with the second inlet channel along the centerline.

3. The mixer of claim 2, further including a first opening formed in the first dividing wall between the first inlet channel and the second outlet channel, and a second opening formed in the first dividing wall between the second inlet channel and the first outlet channel.

4. The mixer of claim 3, wherein the first opening is triangular-shaped.

5. The mixer of claim 3, wherein the first opening is concave-shaped.

6. The mixer of claim 3, wherein the first dividing wall includes a first flange at least partially defining the first opening and a second flange at least partially defining the second opening.

7. The mixer of claim 6, wherein the first flange is a first curved flange at least partially defining the first opening, and wherein a portion of the first opening is defined by a constant radius.

8. The mixer of claim 6, wherein the first flange is cusp shaped.

9. The mixer of claim 1, wherein the first guide wall and the second guide wall are non-linear.

10. The mixer of claim 9, wherein the first guide wall and the second guide wall are S-shaped.

11. The mixer of claim 10, wherein the first guide wall and the second guide wall are sigmoid-shaped.

12. The mixer of claim 1, further including
- a third inlet channel;
- a second dividing wall positioned between the second inlet channel and the third inlet channel, the second dividing wall radially extending from the centerline.

13. The mixer of claim 12, wherein the third inlet channel directs material away from the centerline.

14. The mixer of claim 12, further including a third opening and a fourth opening formed in the second dividing wall.

15. The mixer of claim 12, wherein the first dividing wall is coupled to the second dividing wall.

16. The mixer of claim 1, further comprising:
- a third inlet channel positioned radially opposite from the first inlet channel about the centerline;
- a fourth inlet channel positioned radially opposite from the second inlet channel about the centerline; and
- a second dividing wall positioned between the third inlet channel and the fourth inlet channel, the second dividing wall radially extending from the centerline.

17. The mixer of claim 16, wherein the second dividing wall is co-planar with the first dividing wall.

18. The mixer of claim 16, further including a first outlet channel aligned with the first inlet channel along the centerline and a second outlet channel aligned with the second inlet channel along the centerline, and further including a first opening formed in the first dividing wall between the first inlet channel and the second outlet channel, and a second opening formed in the first dividing wall between the second inlet channel and the first outlet channel.

* * * * *